(12) United States Patent
Timmons et al.

(10) Patent No.: US 12,214,527 B2
(45) Date of Patent: *Feb. 4, 2025

(54) SAW CART

(71) Applicant: MILWAUKEE ELECTRIC TOOL CORPORATION, Brookfield, WI (US)

(72) Inventors: Terry L. Timmons, Oconomowoc, WI (US); Dane Laitinen, Wauwatosa, WI (US); Mitchell Carlson, Lisbon, WI (US); Bradley S. Helm, Milwaukee, WI (US); Paul W. Eiche, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/063,180

(22) Filed: Dec. 8, 2022

(65) Prior Publication Data

US 2023/0106037 A1 Apr. 6, 2023

Related U.S. Application Data

(63) Continuation of application No. 16/514,862, filed on Jul. 17, 2019, now Pat. No. 11,548,186.

(Continued)

(51) Int. Cl.
*B28D 7/00* (2006.01)
*B28D 1/04* (2006.01)
(Continued)

(52) U.S. Cl.
CPC .............. *B28D 7/00* (2013.01); *B28D 1/045* (2013.01); *B62B 3/02* (2013.01); *B62B 3/10* (2013.01); *B62B 3/12* (2013.01); *B62B 2202/48* (2013.01)

(58) Field of Classification Search
CPC . B28D 7/00; B28D 1/045; B28D 3/02; B28D 3/10; B28D 3/12; B28D 2202/48
(Continued)

(56) References Cited

U.S. PATENT DOCUMENTS

| 1,106,225 A | 8/1914 | Kreeger |
| 2,435,192 A | 2/1948 | Arsneau |

(Continued)

FOREIGN PATENT DOCUMENTS

| DE | 1964605 U | 3/1967 |
| DE | 7040737 U | 5/1971 |

(Continued)

OTHER PUBLICATIONS

International Search Report and Written Opinion for Application No. PCT/US2016/042279 dated Nov. 6, 2019 (13 pages).

(Continued)

*Primary Examiner* — Hau V Phan
(74) *Attorney, Agent, or Firm* — Michael Best & Friedrich LLP

(57) ABSTRACT

A cart for carrying a cut-off saw having a saw blade. The cart includes a frame with upper and lower portions, a wheel arm pivotably coupled to the lower portion about a first axis, and a rear wheel assembly coaxial with the first axis and coupled to the frame and the wheel arm. The cart includes a front wheel coupled to an end of the wheel arm opposite the rear wheel assembly, an adjustment lever pivotably coupled to the upper portion about a second axis, and a link having a first end pivotably coupled to the adjustment lever and spaced from the second axis, and a second end pivotably coupled to the wheel arm between the first axis and the front wheel. Pivoting the adjustment lever about the second axis pivots the wheel arm about the first axis to adjust a vertical position of the front wheel relative to the upper portion.

19 Claims, 20 Drawing Sheets

Related U.S. Application Data

(60) Provisional application No. 62/699,271, filed on Jul. 17, 2018.

(51) Int. Cl.
   *B62B 3/02*     (2006.01)
   *B62B 3/10*     (2006.01)
   *B62B 3/12*     (2006.01)

(58) Field of Classification Search
   USPC .......................................................... 173/24
   See application file for complete search history.

(56) References Cited

U.S. PATENT DOCUMENTS

| | | | |
|---|---|---|---|
| 2,455,369 A | 12/1948 | Kuykendall | |
| 2,468,336 A | 4/1949 | Lewis | |
| 2,635,649 A | 4/1953 | Brownlee | |
| 2,673,725 A | 3/1954 | Coates | |
| 2,736,350 A | 2/1956 | Hill et al. | |
| 3,301,601 A | 1/1967 | Zuzelo | |
| 3,357,745 A | 12/1967 | Cooper | |
| 3,675,689 A | 7/1972 | Rice | |
| 4,175,788 A | 11/1979 | Jacobson et al. | |
| 4,310,198 A | 1/1982 | Destree | |
| 4,840,431 A | 6/1989 | Jedick | |
| 4,938,201 A | 7/1990 | Chiuminatta et al. | |
| 4,953,523 A | 9/1990 | Swan | |
| 5,104,195 A | 4/1992 | Zaccho | |
| 5,167,215 A | 12/1992 | Harding | |
| 5,241,946 A | 9/1993 | Yelton et al. | |
| 5,305,729 A | 4/1994 | Chiuminatta et al. | |
| 5,435,294 A | 7/1995 | Williamson | |
| 5,452,943 A | 9/1995 | Campbell | |
| 5,669,371 A | 9/1997 | Rupprecht et al. | |
| 5,676,126 A | 10/1997 | Rupprecht et al. | |
| 5,680,854 A | 10/1997 | Kinglsey et al. | |
| 5,709,200 A | 1/1998 | Mertes | |
| 5,950,612 A | 9/1999 | Zuzelo et al. | |
| 6,349,712 B1 | 2/2002 | Halstead | |
| 6,478,666 B1 | 11/2002 | Berger et al. | |
| 6,484,711 B2 | 11/2002 | Acker et al. | |
| 6,536,422 B1 | 3/2003 | Zuzelo et al. | |
| 6,595,840 B1 | 7/2003 | Jaensch et al. | |
| 6,637,423 B1 | 10/2003 | Rettenweber et al. | |
| 6,990,972 B2 | 1/2006 | Markley | |
| 6,996,909 B1 | 2/2006 | Buck et al. | |
| 7,000,605 B2 | 2/2006 | Due | |
| 7,080,851 B2 | 7/2006 | Schipper | |
| 7,144,311 B2 | 12/2006 | Jaensch | |
| 7,311,100 B1 | 12/2007 | Siewers | |
| 7,422,292 B2 | 9/2008 | Johnson et al. | |
| 7,469,694 B2 | 12/2008 | Howard et al. | |
| 7,487,770 B2 | 2/2009 | Johnson et al. | |
| 7,497,522 B2 | 3/2009 | Thornton et al. | |
| 7,669,589 B2 | 3/2010 | Kinglsey et al. | |
| 7,704,123 B2 | 4/2010 | Marsic et al. | |
| 7,905,223 B2 * | 3/2011 | von Siegroth | B24B 27/08 125/13.01 |
| 7,909,410 B2 | 3/2011 | Collister et al. | |
| 8,186,762 B2 * | 5/2012 | Aronsson | B23D 47/02 299/39.3 |
| 8,347,872 B2 | 1/2013 | Gobright | |
| 8,360,045 B2 | 1/2013 | Marsic et al. | |
| 8,931,471 B2 | 1/2015 | Ruffner et al. | |
| 9,561,574 B2 | 2/2017 | Wisenbaker | |
| 9,808,961 B2 | 11/2017 | Jenkins | |
| 11,548,186 B2 * | 1/2023 | Timmons | B62B 3/12 |
| 2002/0096166 A1 | 7/2002 | Halstead | |
| 2003/0168054 A1 | 9/2003 | Governo et al. | |
| 2005/0155594 A1 | 7/2005 | Patzke et al. | |
| 2006/0240753 A1 | 10/2006 | Ziegs | |
| 2007/0109796 A1 | 5/2007 | Johnson | |
| 2007/0163566 A1 | 7/2007 | Johnson et al. | |
| 2007/0194617 A1 | 8/2007 | Moller et al. | |
| 2007/0246583 A1 | 10/2007 | Gorenflo | |
| 2008/0233847 A1 | 9/2008 | Von Siegroth et al. | |
| 2009/0107476 A1 | 4/2009 | Gobright, IV | |
| 2010/0180453 A1 | 7/2010 | Aronsson et al. | |
| 2010/0251867 A1 | 10/2010 | Shao et al. | |
| 2011/0209692 A1 | 9/2011 | Gobright, IV | |
| 2011/0303060 A1 | 12/2011 | Shima et al. | |
| 2012/0068525 A1 | 3/2012 | Moller | |
| 2012/0174905 A1 | 7/2012 | Lee | |
| 2014/0102432 A1 | 4/2014 | Edwards | |
| 2015/0204415 A1 | 7/2015 | Bateman et al. | |
| 2016/0221222 A1 | 8/2016 | Jenkins | |
| 2018/0104851 A1 | 4/2018 | Rieger | |

FOREIGN PATENT DOCUMENTS

| | | |
|---|---|---|
| DE | 8709158 U1 | 8/1987 |
| DE | 202011110548 U1 | 9/2014 |

OTHER PUBLICATIONS

Chinese Patent Office Action for Application No. 20190000874.3 dated Oct. 14, 2021 (3 pages including statement of relevance).

* cited by examiner

SAW CART

CROSS-REFERENCE TO RELATED APPLICATIONS

This application is a continuation of U.S. patent application Ser. No. 16/514,862, filed Jul. 17, 2019, now U.S. Pat. No. 11,548,186, which claims priority to U.S. Provisional Patent Application No. 62/699,271, filed Jul. 17, 2018, the entire contents of which is incorporated herein by reference.

FIELD OF THE INVENTION

The present invention relates to a cart, and more particularly to a cart for a cut-off saw.

BACKGROUND OF THE INVENTION

Power tools such as, for instance, cut-off saws, generally have many applications. Cut-off saws can be held directly by a user or supported by a cart. The cart allows the saw to make precise cuts into a floor surface such as concrete or asphalt. In order to do so, the cart needs to be able to support the saw and its associated equipment, adjust aspects of the saw, such as cutting depth, and control activation of the saw.

SUMMARY OF THE INVENTION

The invention provides, in one aspect, a cart for carrying a cut-off saw having a saw blade. The cart includes a frame with an upper portion and a lower portion, a wheel arm pivotably coupled to the lower portion of the frame about a first axis, and a rear wheel assembly coaxial with the first axis and coupled to the frame and the wheel arm. The cart further includes a front wheel coupled to an end of the wheel arm opposite the rear wheel assembly, an adjustment lever pivotably coupled to the upper portion of the frame about a second axis, and a link having a first end pivotably coupled to the adjustment lever at a location spaced from the second axis, and a second end pivotably coupled to the wheel arm at a location between the first axis and the front wheel. Pivoting the adjustment lever about the second axis pivots the wheel arm about the first axis to adjust a vertical position of the front wheel relative to the upper portion of the frame, and therefore a vertical position of the saw blade relative to a support surface of the cart.

The invention provides, in another aspect, a cart for carrying a cut-off saw having a saw blade, a motor drivably coupled to the saw blade, and a trigger for varying the rotational speed of the motor and saw blade. The cart includes a frame, a handle coupled to the frame, a throttle lever pivotably coupled to the handle, and a throttle cable having a first end and a second end opposite the first end. The first end is proximate the trigger to selectively pull the trigger, thereby varying the rotational speed of the motor and saw blade. The cart further includes an actuator supported by the handle and movable between a first position, in which pivoting movement of the throttle lever is incapable of tensioning the throttle cable for pulling the trigger, and a second position, in which pivoting movement of the throttle lever tensions the throttle cable for pulling the trigger.

The invention provides, in another aspect, a cart for carrying a cut-off saw having a saw blade, a motor drivably coupled to the saw blade, and a first removable battery pack for powering the motor. The cart includes a frame with an upper portion and a lower portion, a wheel arm pivotably coupled to the lower portion of the frame, a rear wheel assembly coupled to the frame and/or the wheel arm, a front wheel coupled to an end of the wheel arm opposite the rear wheel assembly, a first mount coupled to the frame to which the cut-off saw is attachable, and a second mount coupled to the frame to which a second removable battery pack, which is interchangeable with the first removable battery pack, is attachable for storage.

In combination with any of the abovementioned embodiments, the cart may further include a water tank carried onboard the frame. In some embodiments, the cart may include a bracket to removably support the water tank on the frame.

In combination with any of the abovementioned embodiments, the cart may further include a loop coupled to an upper portion of the frame to permit a device, such as a crane or the like, to hook onto the cart for easy transportation of the cart.

In combination with any of the abovementioned embodiments, the cart may further include a rear wheel assembly having a left wheel, a right wheel, a solid axle connecting the left and right wheels, and an adjustment knob. To adjust the lateral position of the axle and wheels, a user can rotate the adjustment knob, allowing the axle to slide linearly relative to the frame. Once a desired position has been reached, a user can rotate the adjustment knob to secure the axle in place.

In combination with any of the abovementioned embodiments, the cart may further include a depth adjustment assembly for changing a cutting depth of the cut-off saw. The depth adjustment assembly may include a hand crank or a foot treadle coupled to a mounting plate for the cut-off saw through a gear assembly. As a user rotates the hand crank or the foot treadle, the gear assembly is driven which pivots the mounting plate about a pivot shaft, thereby adjusting the cutting depth of the saw.

In combination with any of the abovementioned embodiments, the cart may further include a depth adjustment assembly for changing a cutting depth of the cut-off saw. The depth adjustment assembly may include an actuator coupled to a mounting plate for the cut-off saw. In response to activation of the actuator, the mounting plate is pivoted about a pivot shaft, thereby adjusting the cutting depth of the saw.

In combination with any of the abovementioned embodiments, the cart may further include a depth adjustment assembly for changing a cutting depth of the cut-off saw. The depth adjustment assembly may include a foot pedal that when engaged releases a lock on a rear axle of the cart allowing a push handle to be pivoted forward to plunge the saw into a support surface. When the foot pedal is fully engaged, it rests on the support surface.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
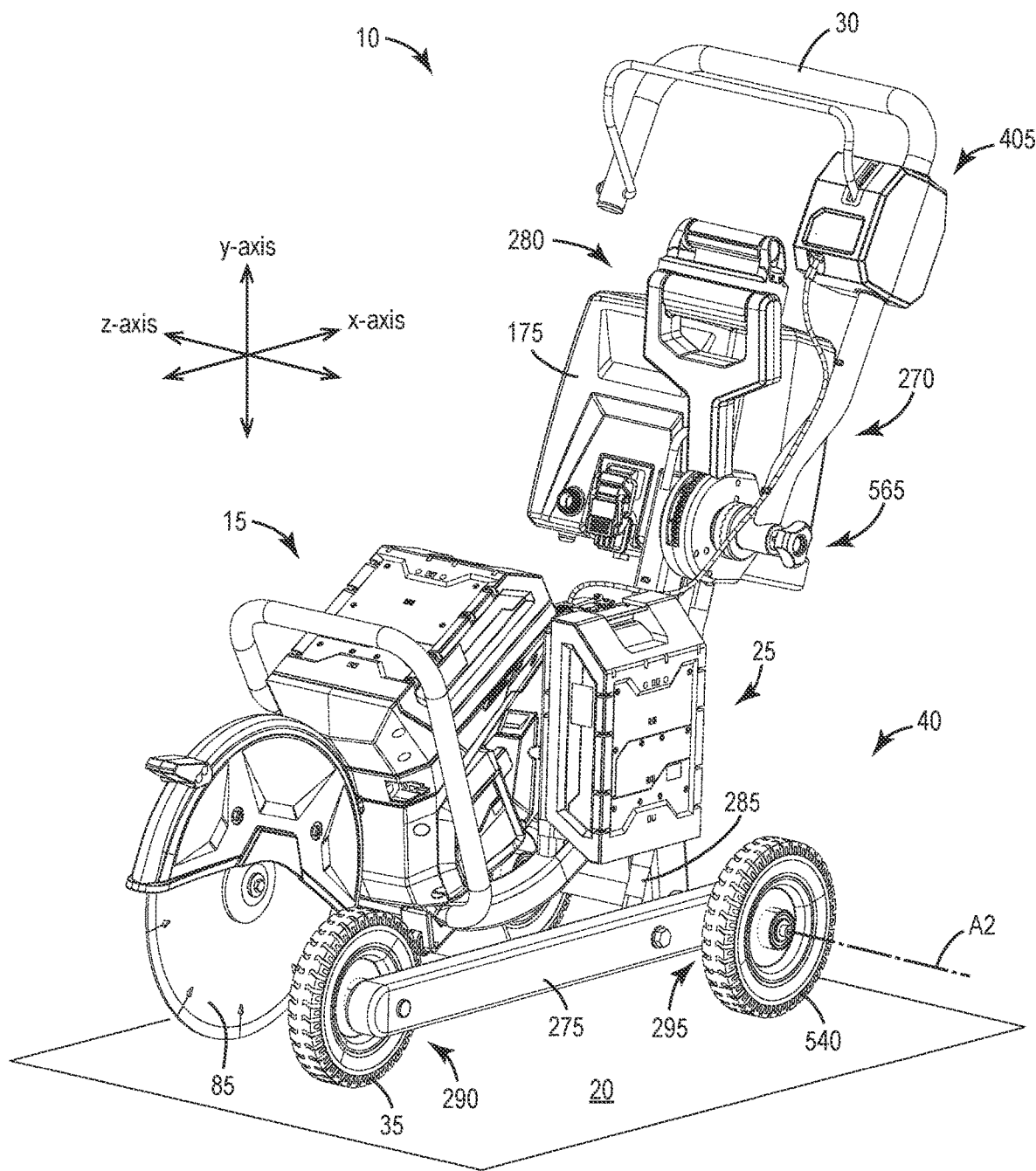
FIG. 1 is a front perspective view of a cart in accordance with an embodiment of the invention supporting a cut-off saw.

FIG. 1 illustrates a cart 10 for supporting a power tool, such as a cut-off saw 15. The cart 10 is capable of conveying the saw 15 over surfaces during operation and for transport. The cart 10 is able to transport the saw 15 in a transport direction, along the x-axis shown in FIG. 1, in either a forward or backwards direction.

Figure 2:
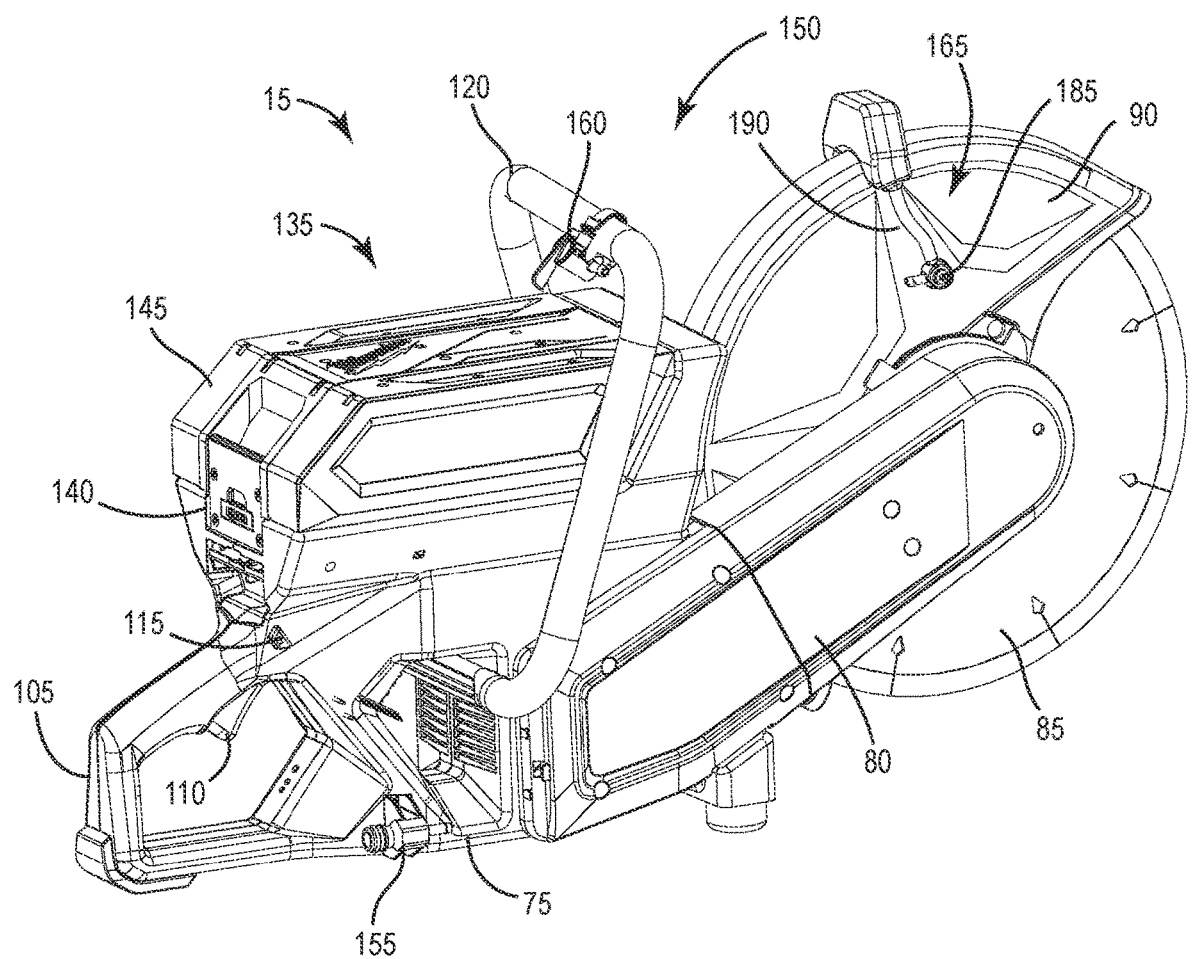
FIG. 2 is a perspective view of the cut-off saw of FIG. 1.

With reference to FIG. 2, the saw 15 includes a housing 75, a support arm 80 coupled to and extending from the housing 75, a cutting wheel 85 carried by the support arm 80, and a guard 90 covering a portion of the circumference of the cutting wheel 85. The cutting wheel 85 can be a blade, an abrasive disk, or any other rotatable element capable of removing material from a workpiece. In the illustrated embodiment, the cutting wheel 85 has a diameter greater than 9 inches and is preferably 14 inches in diameter. In other embodiments, the cutting wheel 85 can be between about 10 inches and about 16 inches in diameter.

The saw 15 includes a rear handle 105 that extends from the rear of the housing 75 in a direction generally opposite the support arm 80. A trigger 110 for operating the saw 15 and a lockout shuttle 115 that prevents the user from pulling the trigger 110 unless it is first depressed are both located on the rear handle 105. The saw 15 also includes a front handle 120 that wraps around an upper portion of the housing 75 and that in conjunction with the rear handle 105, provides grip areas to facilitate two-handed operation of the saw 15.

The saw 15 includes an on-board battery pack 135 that provides power to an electric motor (not shown). The battery pack 135 is removably coupled to a battery receptacle 140, which is located on the upper portion of the housing 75. As such, the front handle 120 at least partially surrounds the battery receptacle 140 and the battery pack 135, when the battery pack 135 is attached to the receptacle 140. The battery pack 135 is a power tool battery pack and includes a battery housing 145 and a plurality of rechargeable battery cells (not shown) disposed within the battery housing 145. The battery cells are lithium-based battery cells but can alternatively have any other suitable chemistry. In the illustrated embodiment, the battery pack 135 has a nominal output voltage of about 80V. In other embodiments, the battery pack 135 can have a different nominal voltage, such as, for example, 36V, 40V, 72V, between 36V and about 80V, or greater than 40V. In an alternative embodiment, the battery receptacle 140 may be incorporated on the cart 10, instead of the saw 15, to provide electrical power to the motor of the saw 15.

With continued reference to FIG. 2, the saw 15 further includes a fluid distribution system 150. The fluid distribution system 150 includes a connector 155 attachable to a fluid supply line 170 (FIG. 11), a control valve 160 supported upon the front handle 120, and a distributor 165 supported upon the guard 90. The supply line 170 provides fluid, such as water, to the fluid distribution system 150 from an external source. In the illustrated embodiment, the external source is a water tank 175 (FIG. 1) carried onboard the cart 10. The water tank 175 includes a connector 180 (FIG. 11), which may include an integrated shutoff valve, to which the supply line 170 is connected. A first line (not shown) extends from the connector 155 to the control valve 160, and a second line (not shown) extends from the control valve 160 to the distributor 165. In the illustrated embodiment, the distributor 165 includes a pair of spray nozzles 185 disposed on opposite sides of the guard 90 connected by a supply line 190. The spray nozzles 185 are operable to discharge fluid onto each side of the cutting wheel 85 for cooling, lubrication, and dust abatement.

Figure 1A:
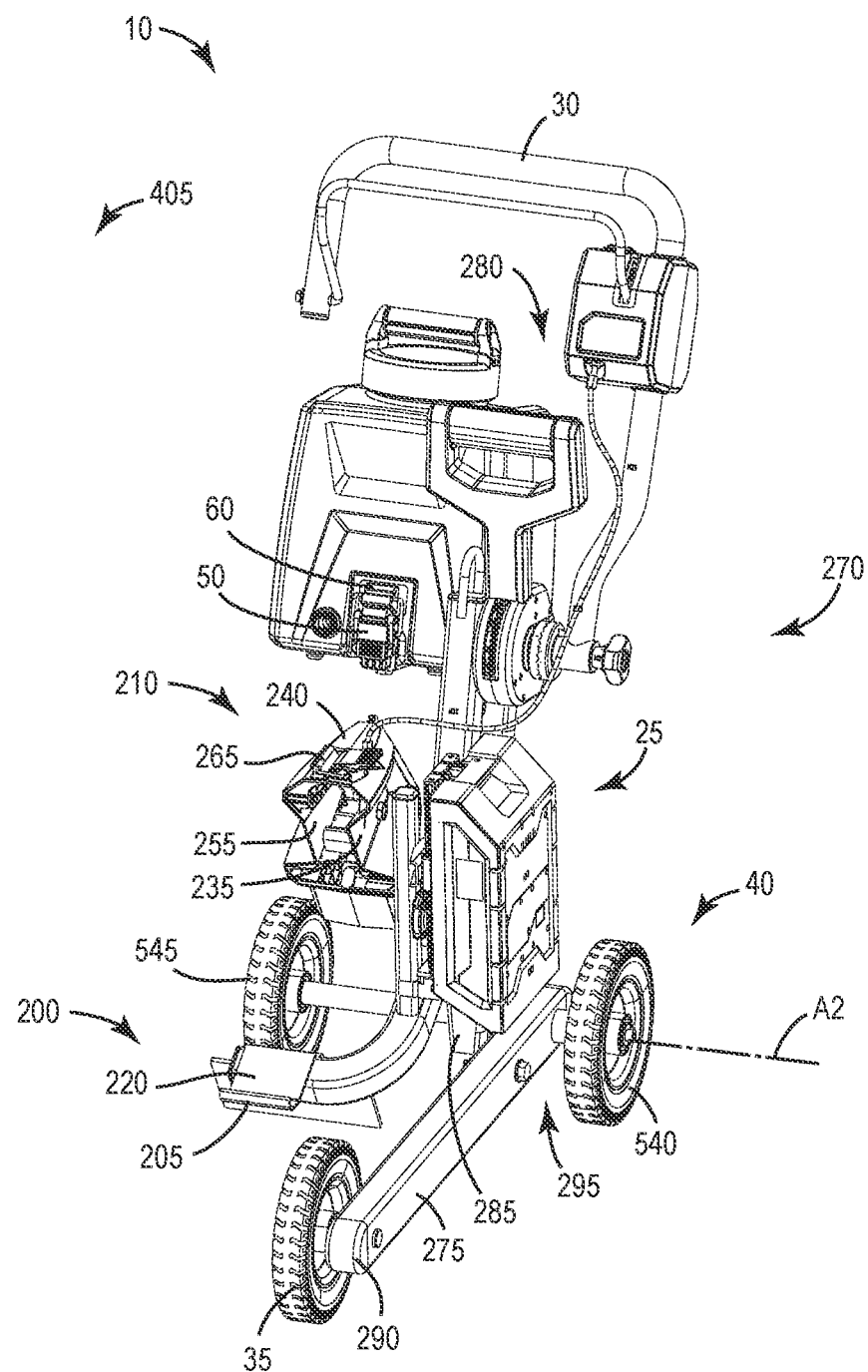
FIG. 1A is a front perspective of the cart of FIG. 1 without the cut-off saw.
Figure 23:
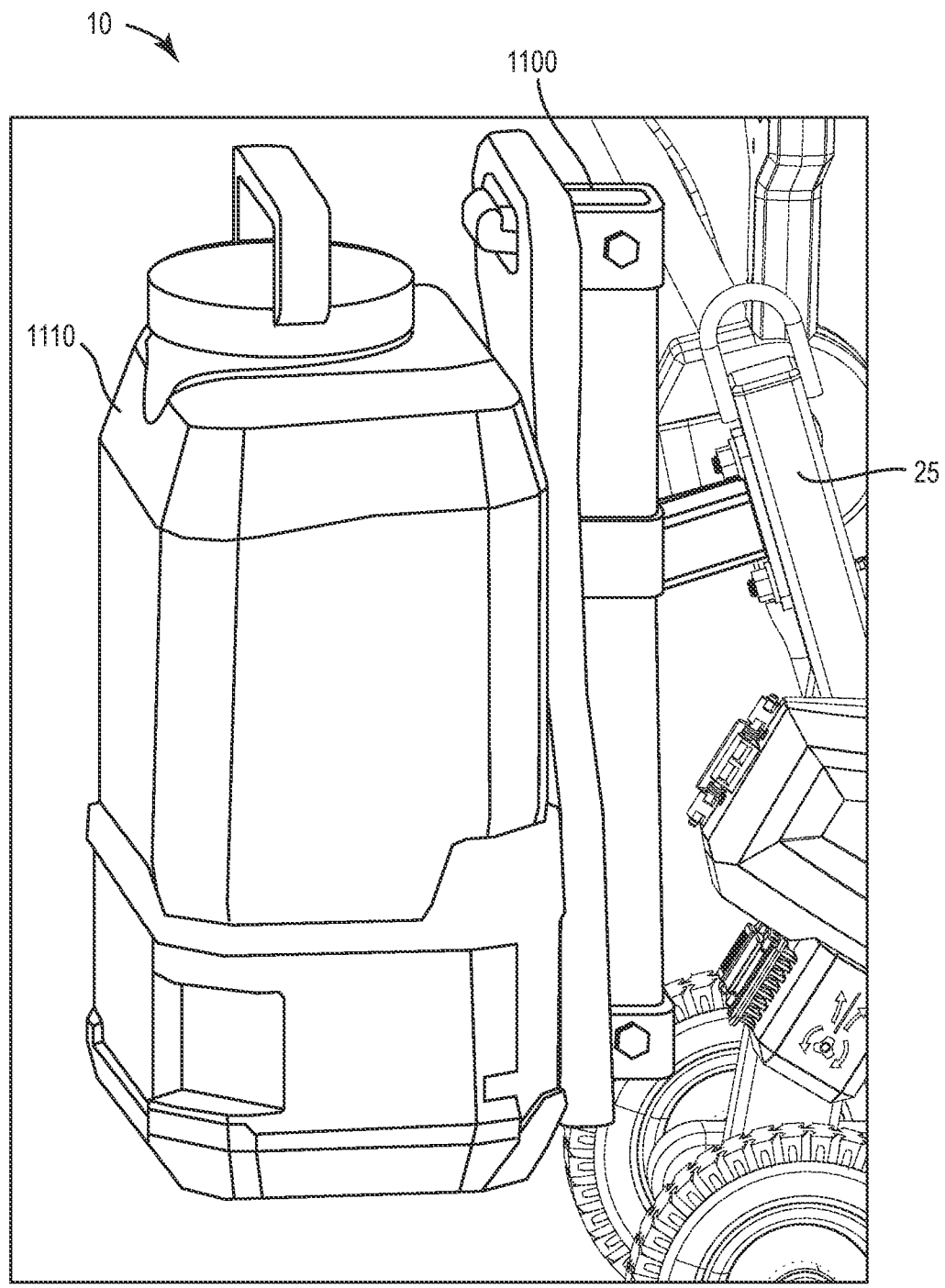
FIG. 23 is a perspective view of a water tank according to another embodiment of the invention on the cart of FIG. 1A.

With reference to FIGS. 1 and 1A, the cart 10 includes a frame 25 to which the saw 15 is attachable, a handle 30 upwardly extending from the frame 25 that is graspable by a user for maneuvering the cart 10, a front wheel 35, and a rear wheel assembly 40 having two rear wheels 540, 545. The frame 25 includes a material discharge guard (e.g., mud flap 45 (FIG. 3)) that blocks material cut by the saw 15 from contacting a user of the cart 10 and a loop 48 (FIG. 6) that is used as a lifting point or hoist loop. The loop 48 is coupled to an upper portion of the frame 25 and allows a device, such as a crane or the like, to hook onto the cart 10 for easy transportation of the cart 10. The loop 48 is capable of supporting up to quadruple the weight of the cart 10. In some embodiments, the loop 48 may be a separate component from the frame 25 that is attached thereto (e.g., by welding, etc.). In other embodiments, the loop 48 may be integrally formed with the frame 25. The cart 10 further includes first and second latches 50 (FIG. 1), 55 (FIG. 5) that are used to retain the water tank 175 on a bracket 58 (FIG. 3) coupled to the frame 25. The first and second latches 50, 55 are on opposite sides of the water tank 175 when positioned for use. The first and second latches 50, 55 are over-center latches that apply a clamping force to hooks 60 on the water tank 175 to pull the water tank 175 downward and secure it in place. The bracket 58 is removably coupled to the frame 25 so the frame 25 can support alternative brackets 1100 that support alternative water tanks 1110 (FIG. 23).

With reference to FIG. 1A, the cart 10 includes a mounting assembly 200 to secure the saw 15 to the frame 25. The mounting assembly 200 includes a front mount 205 on a lower portion of the frame 25 and a rear mount 210 on an upper portion of the frame 25. As shown in FIGS. 1A, the front mount 205 defines a channel 220 in which a lower portion of the front handle 120 of the saw 15 is receivable. The channel 220 is open along its top and lateral sides to facilitate insertion of the handle 120 from the top of the channel 220 (i.e., in a direction parallel the y-axis shown in FIG. 1) or from the side of the channel 220 (i.e., in a direction parallel to the z-axis).

Figure 3:
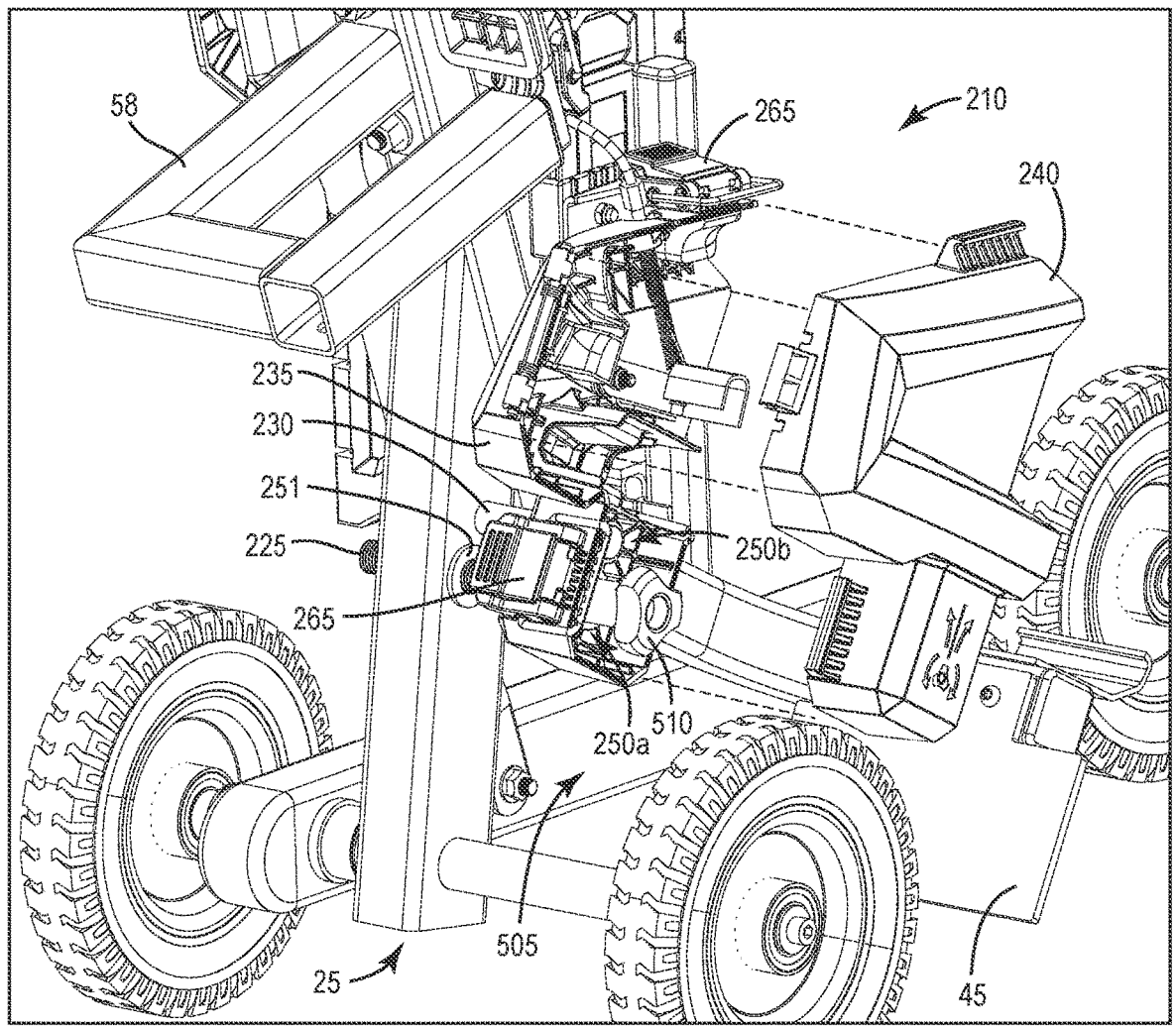
FIG. 3 is an enlarged view of a rear mount of the cart of FIG. 1A for attaching the cut-off saw.

With reference to FIG. 3, the rear mount 210 includes a housing 235 and a cover 240 that is pivotably coupled to the housing 235 about an axis (not shown). The housing 235 includes parallel bores 250a, 250b through which a threaded rod 225 and a guide rod 230, respectively, protrude for supporting the housing 235 on the frame 25. The guide rod 230 is cantilevered from the frame 25 and includes a smooth cylindrical outer periphery along which the bore 250a is slidable. The threaded rod 225 is also cantilevered from the frame 25, and includes external threads that are engaged with a bushing 251 that is welded in the frame 25. Further description of the operation of the threaded rod 225 appears below. When the cover 240 is closed, the housing 235 and cover 240 define a cavity 255 (FIG. 4) in which the rear handle 105 of the saw 15 is positioned. When the cover 240 is pivoted away from the housing 235 toward an open position, the rear handle 105 is removable from the cavity 255.

Figure 4:
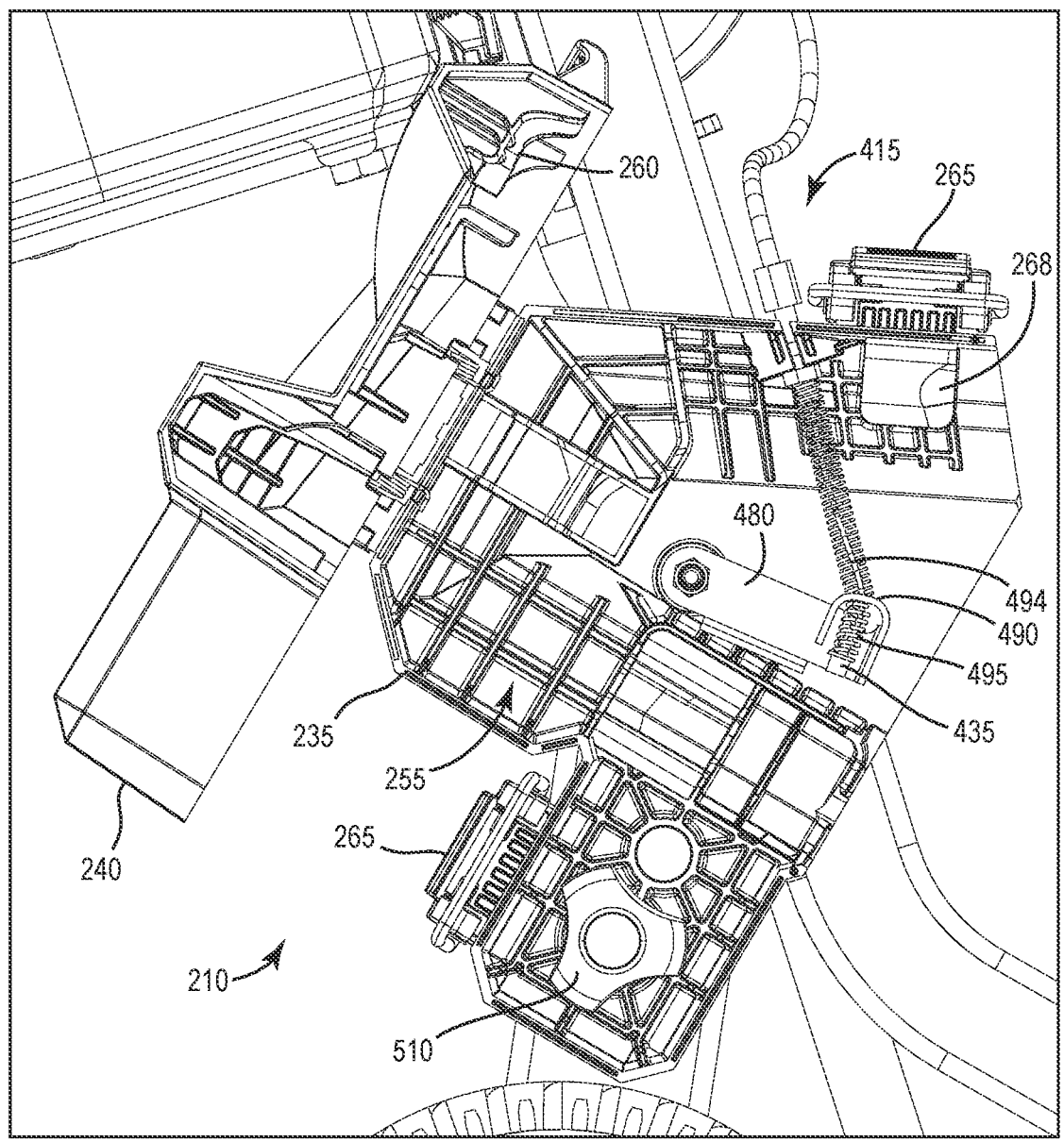
FIG. 4 is a side view of the rear mount of FIG. 3 in an open position.

With reference to FIG. 4, the cover 240 includes a boss 260 on its interior that presses the lockout shuttle 115 of the saw 15 when the cover 240 is moved to the closed position, which allows the trigger 110 to be pulled to operate the saw 15. In some embodiments, the cover 240 and/or the housing 235 may include a resilient member (e.g., a compression or torsion spring) that biases the cover 240 away from the housing 235 to keep the cavity open for ease of tool attachment. The rear mount 210 further includes two latches 265 that secures the cover 240 in the closed position. In the illustrated embodiment, the latches 265 are configured as an over-center latches 265 to apply a clamping force between the cover 240 and the housing 235 to thereby maintain the lockout shuttle 115 in an override position.

To position the saw 15 on the cart 10, a user holds the rear and front handles 105, 120 of the saw 15 and aligns the rear handle 105 with the rear mount 210 and the front handle 120 with the front mount 205. The user then lowers the front handle 120 along the y-axis into the channel 220. Simultaneously, with the cover 240 in its open position, the rear handle 105 is moved transversely along the z-axis and positioned into the portion of the cavity 255 defined by the housing 235. The cover 240 is then pivoted to the closed position and the latches 265 adjusted to its locking configuration, thereby securing the saw 15 on the cart 10. In some embodiments, the cover 240 includes internal features (e.g., integral guides, etc.) that bias the handle 105 of the saw 15 into supports 268 of the housing 235. In other words, the cover 240 includes internal features that naturally guide the handle 105 into the cavity 255 as the cover 240 is being closed to secure the handle 105 in the rear mount 210. The motion of pivoting the cover 240 to the closed position engages the lockout shuttle 115 with the boss 260, moving the lockout shuttle 115 to the override position where the trigger 110 may be pulled to activate the saw 15.

Figure 5:
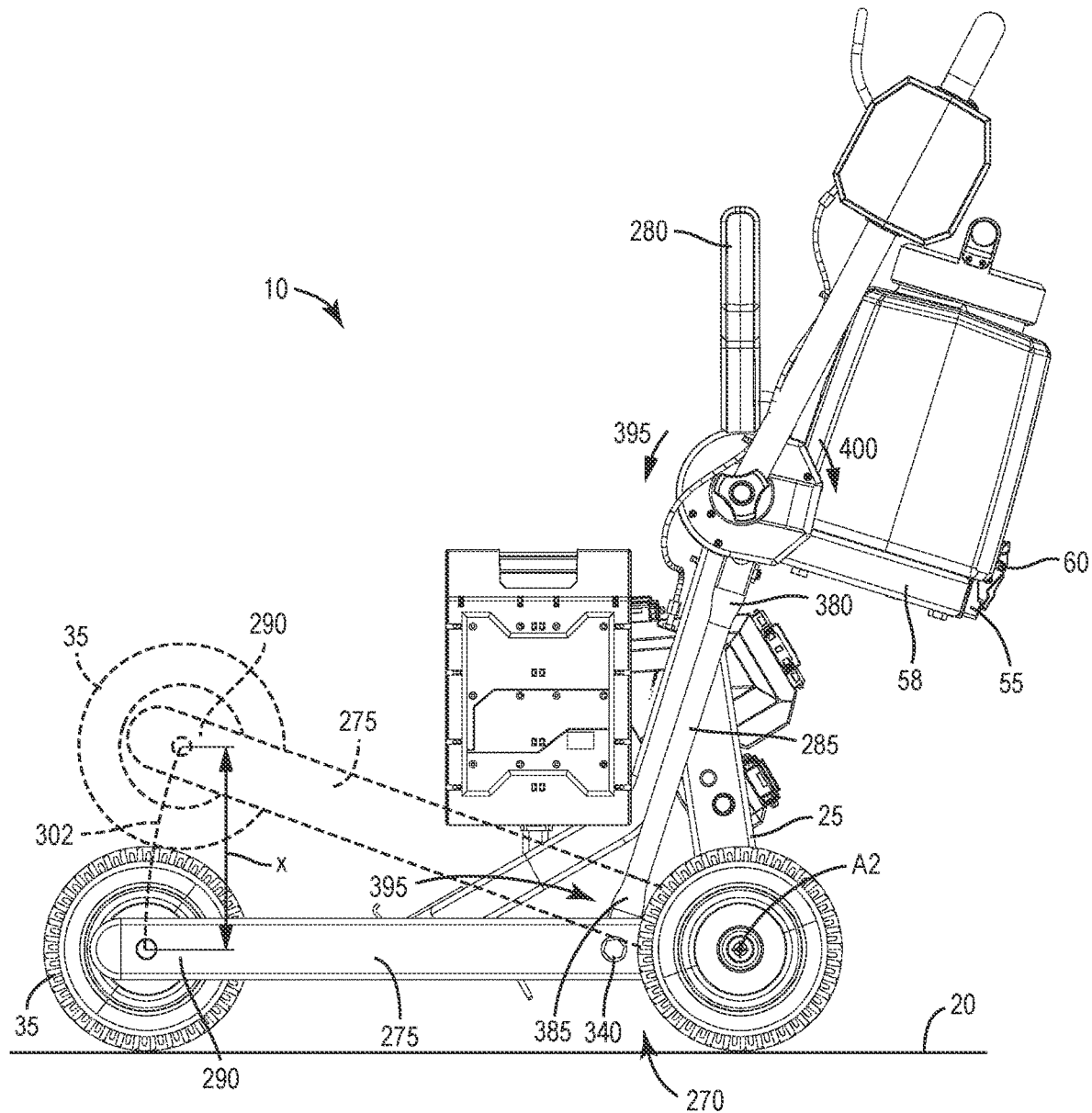
FIG. 5 is a side view of the cart of FIG. 1A, illustrating a depth adjustment assembly.

With reference to FIGS. 5, the cart 10 further includes a depth adjustment assembly 270 for varying the plunge depth of the cutting wheel 85 into a support surface 20 of the cart 10. The depth adjustment assembly 270 includes a wheel arm 275, an adjustment lever 280, and a link 285 interconnecting the wheel arm 275 and the adjustment lever 280. The wheel arm 275 includes a first end 290 and a second end 295 (FIG. 1) opposite the first end 290. The front wheel 35 is rotatably coupled to the first end 290 of the wheel arm 275, whereas the second end 295 is pivotably coupled to a lower portion of the frame 25 about an axis A2, which is also the rotational axis of the rear wheels 540, 545 (FIGS. 1 and 1A). As such, the position of the front wheel 35 relative to the frame 25 is adjustable along an arc 302 having an origin intersected by the axis A2.

Figure 6:
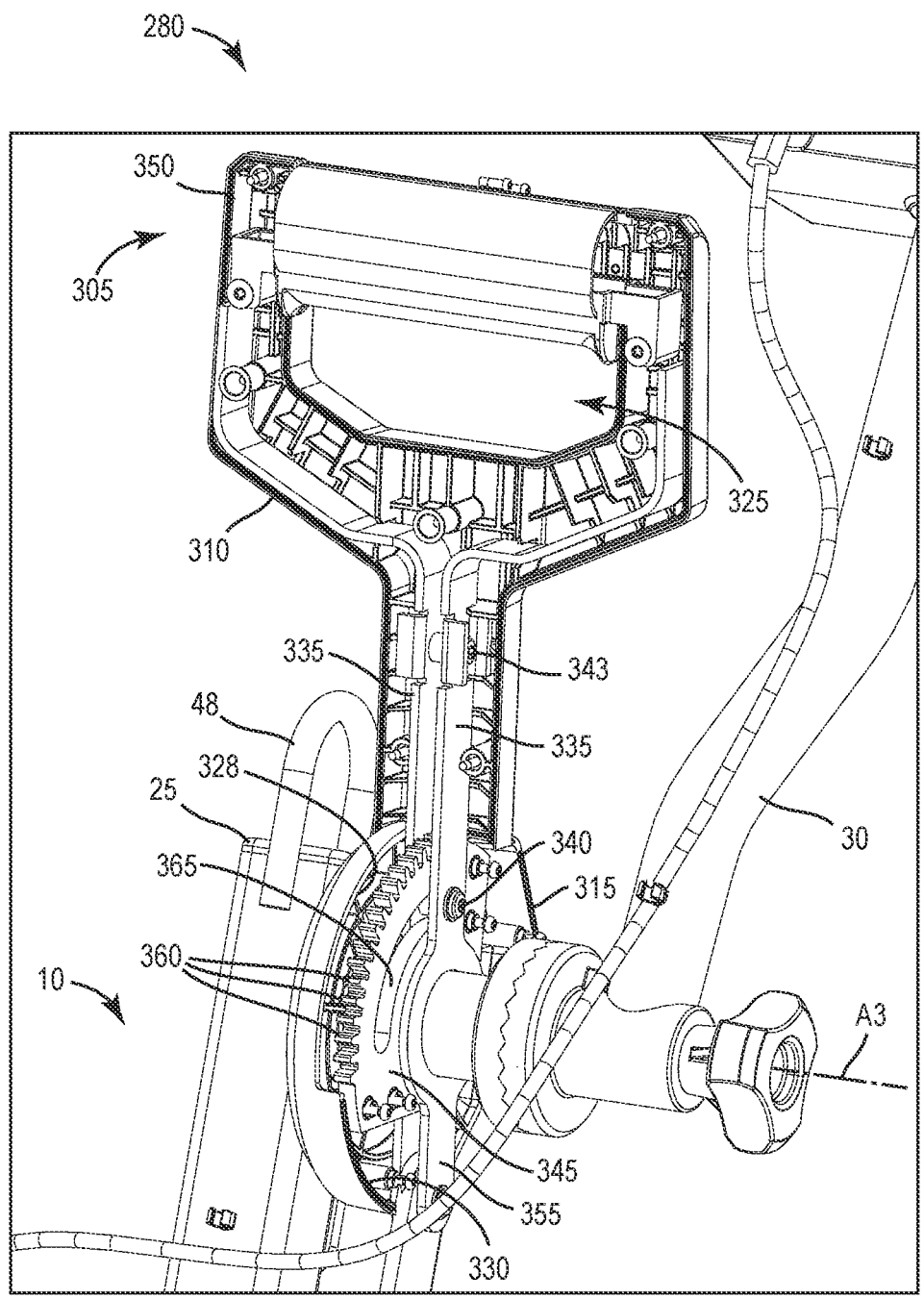
FIG. 6 is a cutaway perspective view of a portion of the depth adjustment assembly of FIG. 1A.

As shown in FIG. 6, the adjustment lever 280 also includes a housing 315 attached to an upper portion of the frame 25 and an arcuate plate 345, which has teeth 360 on its outer periphery, affixed to the housing 315. Accordingly, the orientation of the housing 315 and the plate 345 is fixed relative to the frame 25. The adjustment lever 280 is pivotably coupled to the frame 25 about an axis A3 that is parallel with axis A2. The adjustment lever 280 includes a D-shaped handle 305 enclosing a pair of support brackets 335 interconnected with pins 340, 343. The arcuate plate 345 is positioned between the support brackets 335. One of the pins 340 extends through an arcuate slot 365 in the plate 345, the radius of which has an origin intersected by the axis A3. Lower ends 355 of the respective support brackets 335 extend from a lower opening 330 in the housing 315. The support brackets 335 also extend from an upper opening 328 in the housing 315 having an arc length corresponding to the arc length of the portion of the plate 345 having the teeth 360.

Figure 7:
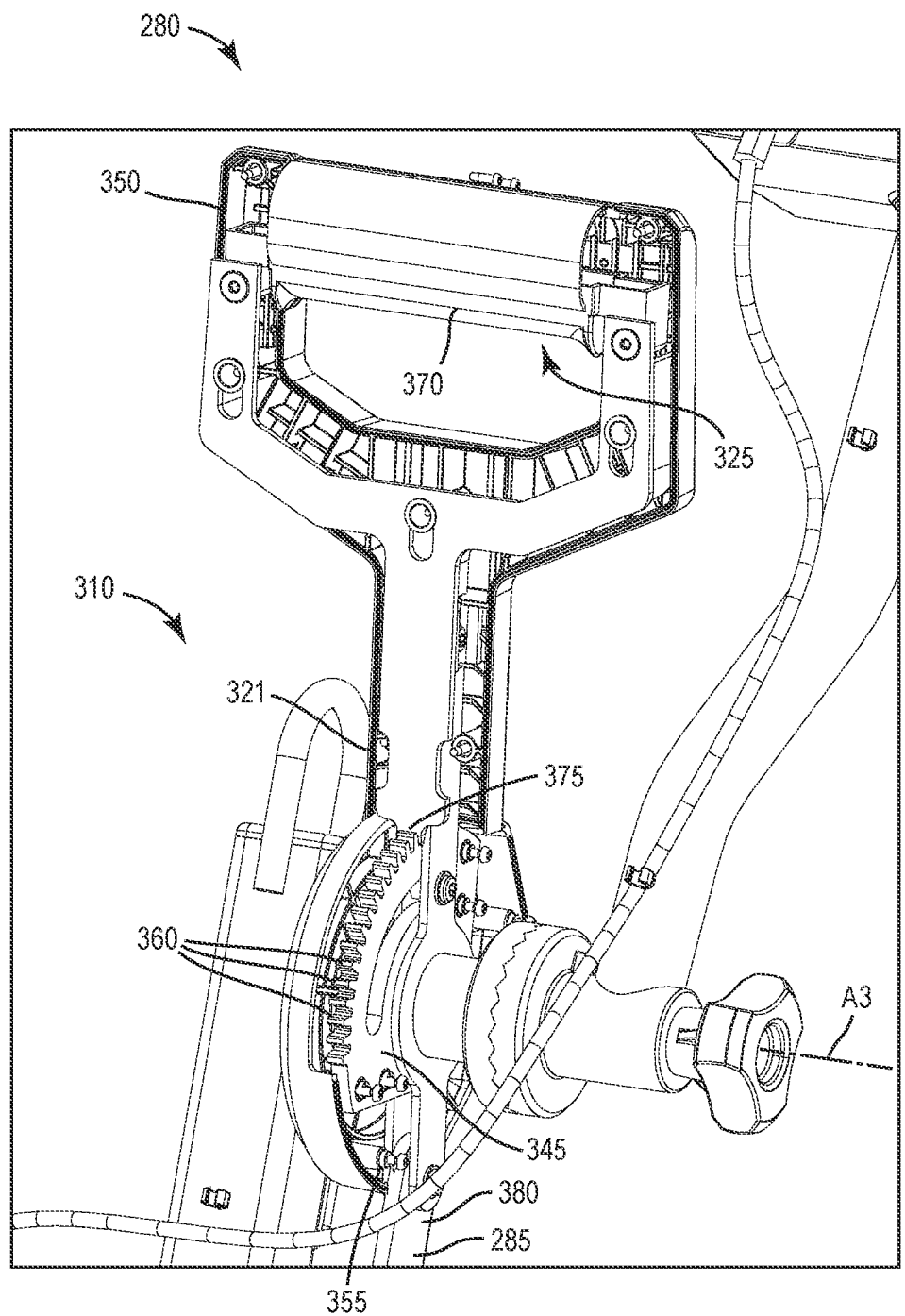
FIG. 7 is another cutaway perspective view of a portion of the depth assembly of FIG. 1A.

With reference to FIG. 7, the adjustment lever 280 includes an actuator (i.e., pull handle 350) having an upper end 370 that protrudes from an internal opening 325 in the D-shaped handle 305 and an opposite, lower end 375 that engages the gear teeth 360 on the arcuate plate 345. The adjustment lever 280 also includes a resilient member (e.g., a compression spring) that biases the pull handle 350 toward a position in which the lower end 375 is engaged with the gear teeth 360. When a user pulls the upper end 370 of the pull handle 350, the lower end 375 is lifted out of engagement with the gear teeth 360, allowing the D-shaped handle 305 to pivot about the axis A3 relative to the housing 315. Although not shown, the housing 315 may include depth adjustment markings thereon for the user to reference when adjusting the position of the D-shaped handle 305.

With reference back to FIG. 5, the link 285 includes a first end 380 that is pivotably coupled to the lower ends 355 (FIG. 7) of the respective support brackets 335 and a second end 385 that is pivotably coupled to the wheel arm 275 via a pin 390 positioned between the first and second ends 290, 295 of the wheel arm 275. In an alternative embodiment, the adjustment lever 280 of the depth adjustment assembly 270 may be replaced by a hand crank, which may be rotatable about an axis to impart displacement to the link 285, thus causing pivoting movement of the wheel arm 275 in the manner described above.

The depth adjustment assembly 270 adjusts the vertical position of the frame 25 relative to the front wheel 35. In other words, the depth adjustment assembly 270 adjusts the vertical position of the cutting wheel 85, when the saw 15 is attached to the cart 10, relative to the support surface 20 of the cart 10 to vary the plunge depth of the cutting wheel 85 into the support surface 20. To adjust the plunge depth of the cutting wheel 85, a user pulls the upper end 370 of the pull handle 350, which lifts the lower end 375 out of engagement with the gear teeth 360 on the arcuate plate 345, allowing the adjustment lever 280 to rotate about the axis A3 (FIG. 7). As the adjustment lever 280 rotates, the wheel arm 275 is pivoted about the axis A2 by the link 285, changing the position of the frame 25 relative to the wheel arm 275, and thus the position of the cutting wheel 85 relative to the support surface 20. If the adjustment lever 280 is rotated forward, as indicated by arrow 395 (FIG. 5), the frame 25 is pivoted downwards relative to the wheel arm 275, dropping the cutting wheel 85 further into the support surface 20 (and increasing the plunge depth of the cutting wheel 85). Alternatively, if the adjustment lever 280 is rotated backwards as indicated by arrow 400 (FIG. 5), the frame 25 is pivoted upwards relative to the wheel arm 275, raising the cutting wheel 85 away from the support surface 20 (and decreasing the plunge depth of the cutting wheel 85).

Figure 11:
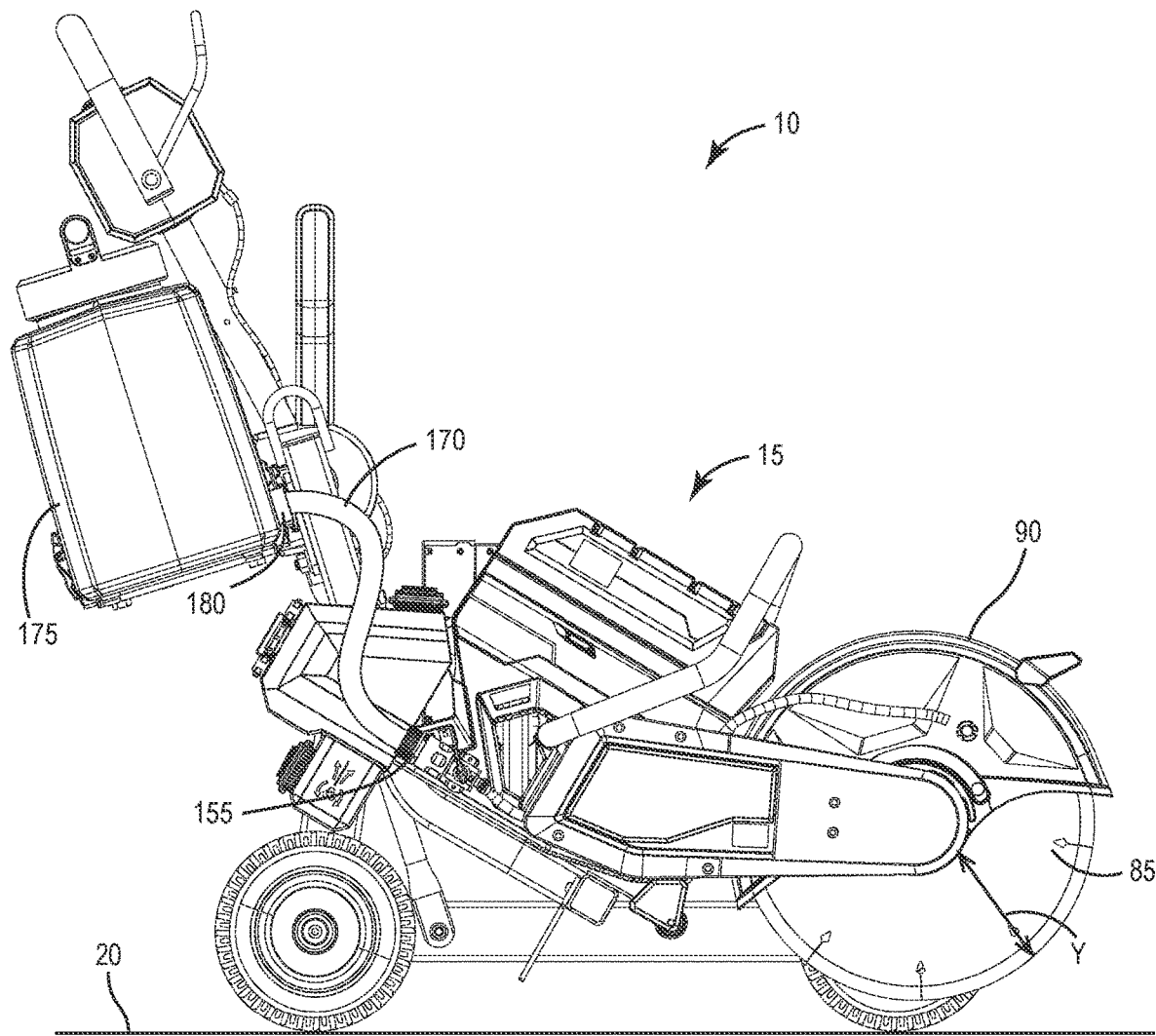
FIG. 11 is a side view of the cart of FIG. 1.

With reference to FIG. 11, a distance Y between the saw guard 90 and the outer periphery of the cutting wheel 85 is indicative of the maximum plunge depth of the cutting wheel 85 into the support surface 20. In one embodiment of the cart 10, the distance Y is within a range of about 4 inches to about 7 inches, depending upon the diameter of the cutting wheel 85 that is used. Now with reference to FIG. 5, the wheel arm 275 is pivotable about the axis A2 relative to the frame 25 between two extreme positions. The first extreme position of the wheel arm 275 (shown in solid lines) is when the cutting wheel 85 is at its minimum plunge depth into the support surface 20, and the second extreme position of the wheel arm 275 (shown in broken lines) is when the cutting wheel 85 is beyond its maximum plunge depth into the support surface 20. Therefore, a vertical distance X between the first end 290 of the wheel arm 275 in the first extreme position and the first end 290 of the wheel arm 275 in the second extreme position will always be greater than the maximum plunge depth of the cutting wheel 85, indicated by distance Y. As such, the wheel arm 275 can always be adjusted a greater amount than the maximum plunge depth of the cutting wheel 85. This allows the cart 10 to be operated with multiple sizes of cutting wheels 85.

Figure 8:
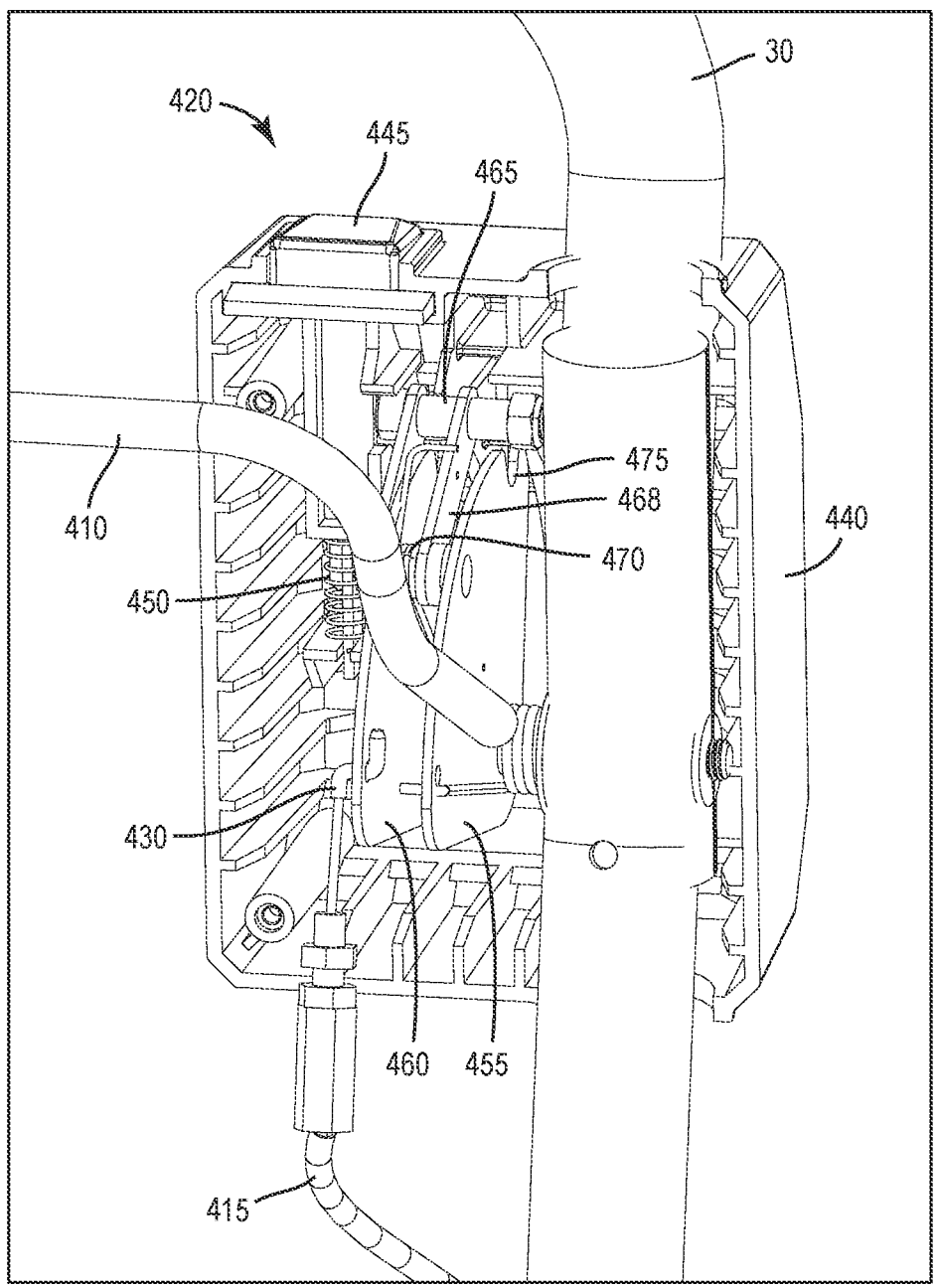
FIG. 8 is a cutaway perspective view of a remote throttle system of the cart of FIG. 1A.

With reference to FIG. 1, the cart 10 includes a remote throttle system 405 for activating and deactivating the saw 15 when it is supported on the frame 25. With reference to FIG. 8, the throttle system 405 includes a throttle lever 410 pivotably coupled to the handle 30 and a throttle cable 415 having a first end 430 that is selectively coupled to the handle 30 and a second end 435 (FIG. 4) proximate the trigger 110 of the saw 15. The remote throttle system 405 also includes an interlock system 420 operable in a first mode in which pivoting movement of the throttle lever 410 is incapable of tensioning the throttle cable 415 for pulling the trigger 110, and a second mode in which pivoting movement of the throttle lever 410 tensions the throttle cable 415 for pulling the trigger 110.

The interlock system 420 includes a housing 440 coupled to the handle 30 and an actuator (e.g., a button 445) that is biased by a spring 450 to protrude from a top side of the housing 440. Within the housing 440, the interlock system 420 includes a first arcuate bracket 455 that is coupled for co-rotation with the throttle lever 410 and a second arcuate bracket 460 that is coupled to the first end 430 of the throttle cable 415. The first arcuate bracket 455 includes a slot 475 on its outer periphery in which a pin 465 is receivable. The second arcuate bracket 460 includes the pin 465 pivotably coupled thereto by extension arms 468. The extension arms 468 and the movable pin 465 are biased upward towards the button 445 by a resilient member (e.g., a torsion spring 470). The button 445 is movable between a first position, in which the spring 450 biases the button 445 away from the pin 465, and a second position, in which the button 445 is depressed against the bias of the spring 450 to push the pin 465 (against the bias of the torsion spring 470) into the slot 475. In the first position of the button 445, the pin 465 is not received in the slot 475, thereby permitting the first arcuate bracket 455 to pivot independently of the second arcuate bracket 460. As a result, pivoting movement of the throttle lever 410 is incapable of tensioning the throttle cable 415 for pulling the trigger 110. In the second position of the button 445, the pin 465 is received within the slot 475 to thereby rotationally unitize the first and second arcuate brackets 455, 460 to pivot in unison with the throttle lever 410 when it is depressed. As a result, pivoting movement of the throttle lever 410 tensions the throttle cable 415 for pulling the trigger 110.

With reference to FIG. 4, the remote throttle system 405 also includes an actuator arm 480 pivotably coupled to the housing 235 of the rear mount 210. The second end 435 of the throttle cable 415 is coupled to the actuator arm 480. The actuator arm 480 is pivotable and includes a finger 490 positioned beneath the trigger 110 of the cut off saw 15, when positioned on the cut off saw cart 10. In some embodiments, the remote throttle system 405 includes a first spring 494 seated on the throttle cable 415 between the actuator arm 480 and the housing 235 and a second spring 495 between the actuator arm 480 and the second end 435 of the throttle cable 415. The first and second springs 494, 495 allow the second end 435 of the throttle cable 415 to continue moving after the finger 490 has squeezed the trigger 110 to its maximum depressed position. This ensures that the throttle lever 410, when pivoted to its maximum depressed position against the handle 30, pulls the trigger 110 to its maximum depressed position coinciding with the maximum rotational speed of the cutting wheel 85 (in an embodiment of the saw 15 where the trigger 110 is configured as a variable-speed trigger). In some embodiments, the throttle cable 415 is routed through the handle 30 and/or the frame 25 of the cart 10. In such embodiments, the throttle cable 415 exits the housing 440 into the handle 30 of the cart 10, and is then routed from the handle 30 into a lower portion of the frame 25. The second end of the throttle cable 415 exits the frame 25 adjacent the housing 235 for connection to the actuator arm 480. All entry and exit openings in the frame 25 may include a grommet to prevent chaffing the jacket of the throttle cable 415. Routing the throttle cable 415 through the frame 25 and handle 30 conceals and protects it.

To activate the saw 15, a user depresses the button 445 to the second position, which depresses the pin 465 against the bias of the torsion spring 470 into the slot 475 to rotationally unitize the first and second arcuate brackets 455, 460. A user then pivots the throttle lever 410 towards the handle 30, pivoting the arcuate brackets 455, 460 and tensioning the throttle cable 415. As a user progressively pulls the throttle lever 410 towards the handle 30, the throttle cable 415 progressively pulls the actuator arm 480 towards the trigger 110 of the saw 15. Because the lockout shuttle 115 is continuously depressed by the boss 260 on the cover 240 of the rear mount 210, the finger 490 squeezes the trigger 110 to activate the motor, thereby varying the rotational speed of the cutting wheel 85 on the saw 15. Once a user releases the throttle lever 410, it pivots away from the handle 30. The torsion spring 470 removes the pin 465 from the slot 475, and the spring 450 displaces the button 445 away from the pin 465. In order to re-activate the cutting wheel 85, a user must again depress the button 445 before pulling the throttle lever 410 towards the handle 30.

With reference to FIG. 3, the cart 10 includes a track control system 505 that adjusts the skew angle of the cutting wheel 85 relative to the support surface 20. The track control system 505 includes the threaded rod 225 and the guide rod 230, discussed above. As discussed above, the threaded rod 225 is received within the bore 250*a* and the threaded bushing 251 welded in the frame 25, whereas the guide rod 230 is slidably received within the bore 250*b*. The threaded rod 225 includes a rotatable knob 510. When the knob 510 and the threaded rod 225 are rotated in a counter-clockwise direction, the rear mount 210 (and thus the rear handle 105 of the saw 15) are moved towards the frame 25, which in turn moves the cutting wheel 85 away from the wheel arm 275. Alternatively, when the knob 510 and the threaded rod 225 are rotated in a clockwise direction, the rear mount 210 (and thus the rear handle 105 of the saw 15) are moved away from the frame 25, which in turn moves the cutting wheel 85 towards the wheel arm 275. In this manner, the skew angle of the cutting wheel 85 relative to the x-axis (FIG. 1) can be adjusted. Additionally, when the cover 240 is closed, the threaded rod 225 and guide rod 230 are arranged in the cavity 255. When the cover 240 is open, a user has access to the knob 510 to adjust the skew of the saw. In some embodiments, the cover 240 includes indicia indicating to a user which way to rotate the knob 510 in order to adjust the skew angle of the saw 15.

Figure 9:
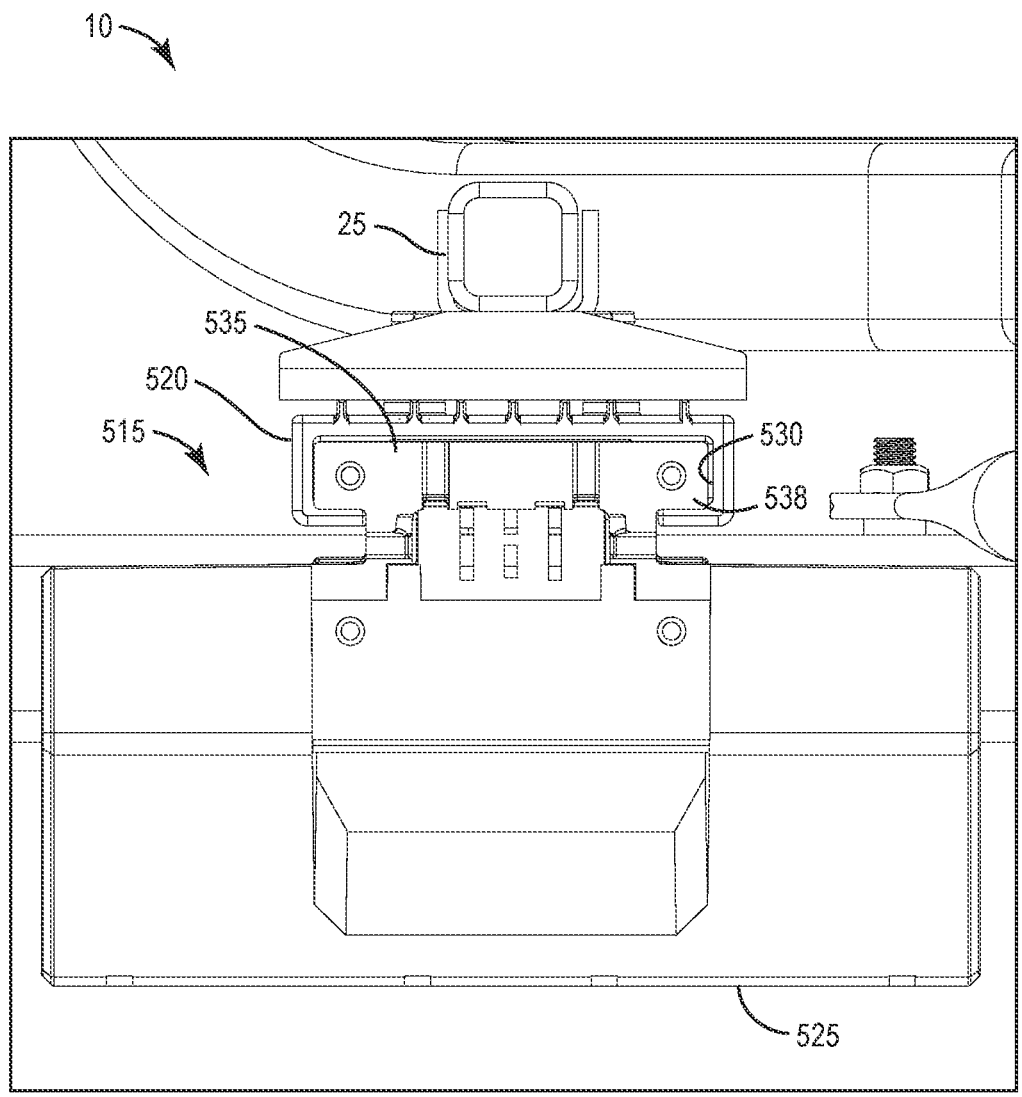
FIG. 9 is a top view of a battery mount on the cart of FIG. 1 with a battery pack attached.

With reference to FIG. 9, the cart 10 further includes a battery pack mount 515 coupled to the frame 25 to which a spare removable battery pack 525, which is interchangeable with the removable battery pack 135 on the saw 15, is attachable for storage. The battery pack mount includes a C-shaped bracket 520 coupled to the frame 25 and defines a channel 530. The removable battery pack 525 includes a rail 535 that has an increased thickness portion 538. The rail 535 is positioned in the channel 530 of the C-shaped bracket 520 to mount the removable battery pack 525 to the cart 10. The rail 535 is friction fit inside the channel 530 of the C-shaped bracket 520 at a point where the rail 535 progresses to the increased thickness portion 538. The battery rail 535 may extend the full length of the removable battery pack 525 or only a portion of the removable battery pack 525. Now referencing FIG. 10, the battery pack mount 515 further includes a platform 539 that supports the bottom of the battery pack 525. The battery pack mount 515 may be coupled to other locations on the frame 25 other than where it is illustrated. In some embodiments, the battery pack mount 515 includes a latch for securing the removable battery pack 525. In further embodiments, the battery pack mount 515 includes terminals for on board charging of the removable battery pack 525. In another embodiment, the battery pack mount 515 stores multiple battery packs.

Figure 12:
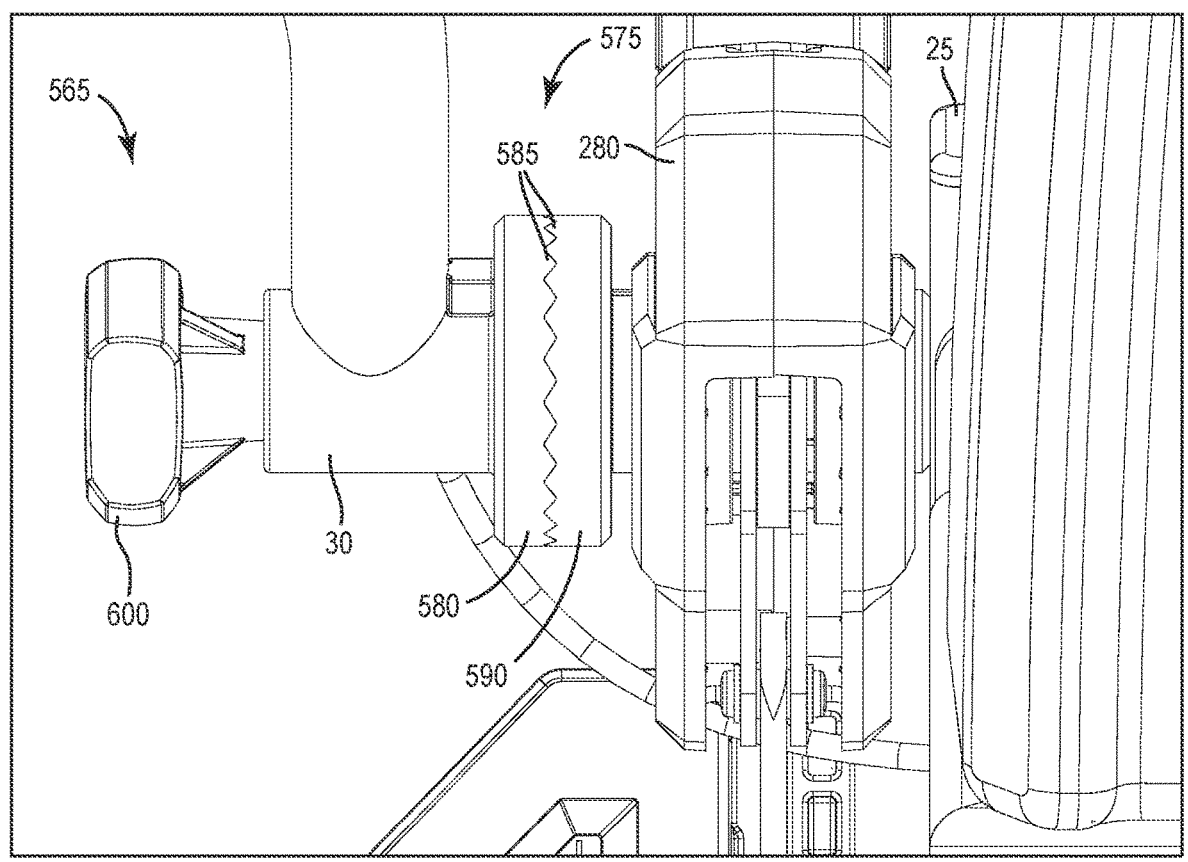
FIG. 12 is an enlarged plan view of an adjustable handle assembly on the cart of FIG. 1A.

With reference to FIG. 12, the cart includes an adjustable handle assembly 565. The handle assembly 565 includes the handle 30 that is graspable by a user pushing the cart 10 and a joint 575 for securing the handle 30 in a desired rotational position relative to the frame 25. The joint 575 includes a first clamshell 580 with teeth 585 fixed to the handle 30, and a second half clamshell 590 with teeth 585 fixed to the frame 25. When the teeth 585 of the first and second clamshells 580, 590 are meshed, the handle 30 is rotationally locked.

Figure 13:
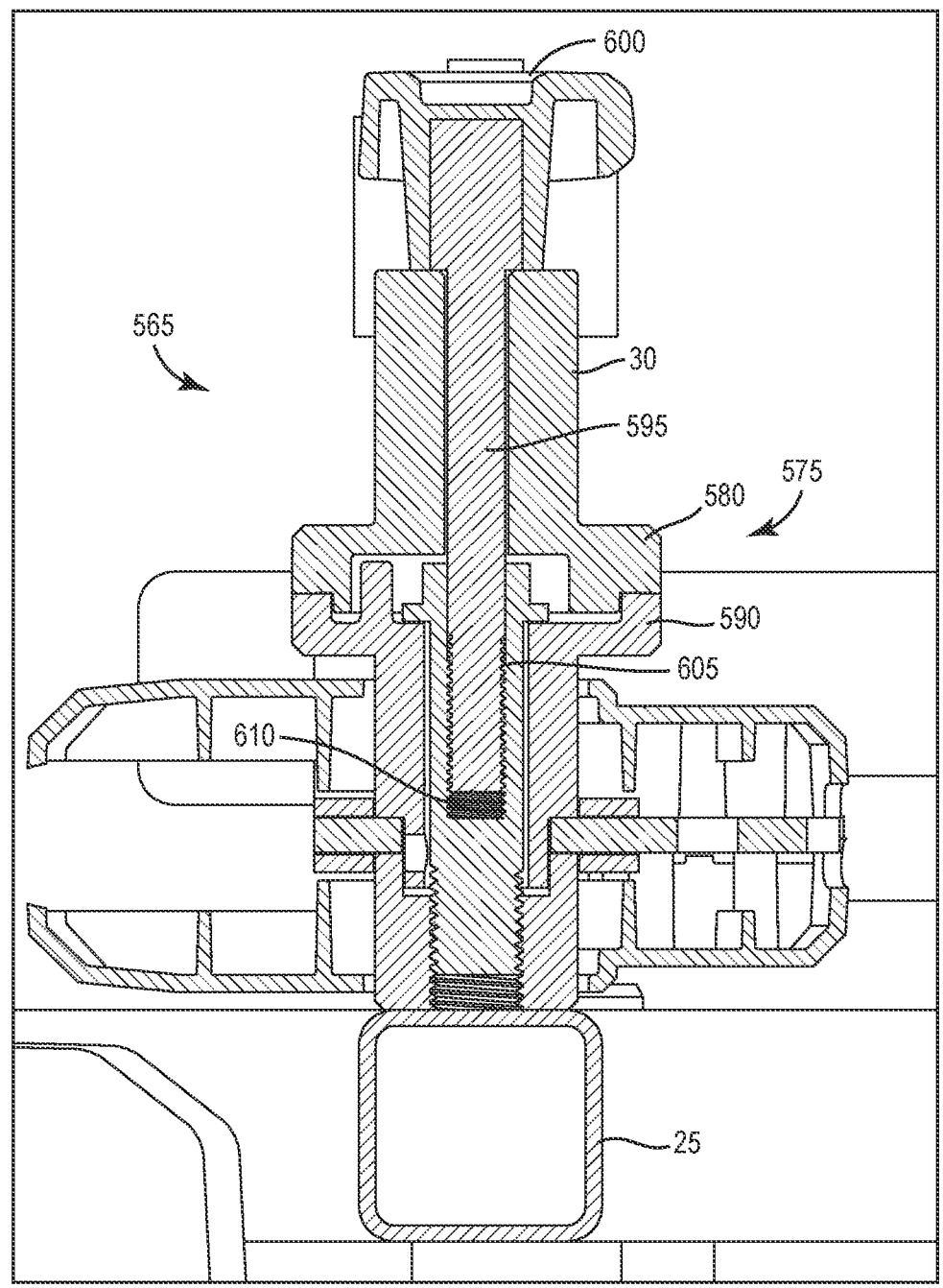
FIG. 13 is a cross-sectional view of the adjustable handle assembly of FIG. 12.
Figure 15:
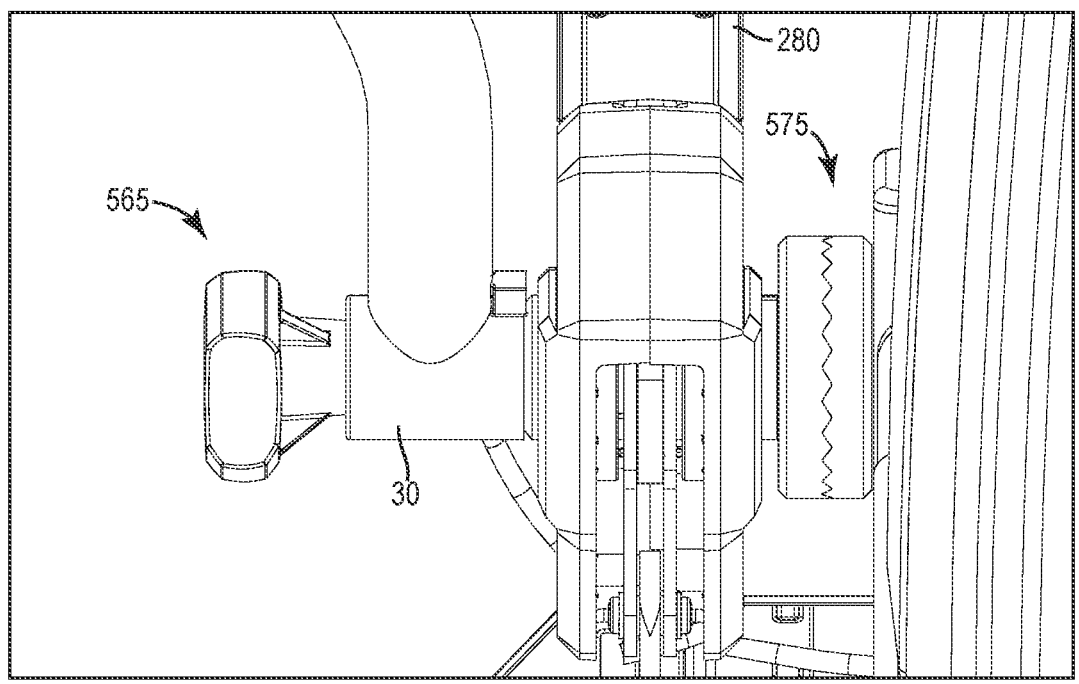
FIG. 15 is an enlarged plan view of an adjustable handle assembly according to another embodiment of the invention on the cart of FIG. 1A.

With reference to FIG. 13, the handle assembly 565 also includes a bolt shank 595 extending through the handle 30 and the first clamshell 580, a knob 600 on one end of the shank 595, and an opposite threaded end 605 threaded to a threaded bore 610 in the second half-clamshell 590. Although not illustrated, a compression spring may be positioned between the clamshells 580, 590 to push them apart. In the illustrated embodiment, the joint 575 is positioned on a side of the adjustment lever 280 that is further away from the frame 25. In other embodiments, the joint 575 may be positioned on a side of the adjustment lever 280 that is closer to the frame 25 as shown FIG. 15.

To adjust the height of the handle assembly 565, a user can rotate the knob 600 to loosen the bolt shank 595 from the threaded bore 610 of the second half-clamshell 590 drawing the first half-clamshell 580 away from the second half-clamshell 590. Once the teeth 585 of the respective clamshells 580, 590 are disengaged, the handle 30 can be rotated relative to the first half-clamshell 580 and bolt shank 595 to a desired height. Once the desired height is reached, a user can rotate the knob 600 in the opposite direction to tighten the connection between the shank 595 and the threaded bore 610, which re-engages the teeth 585 of the respective clamshells 580, 590, again locking the rotational position (and therefore the height) of the handle 30 relative to the frame 25.

Figure 10:
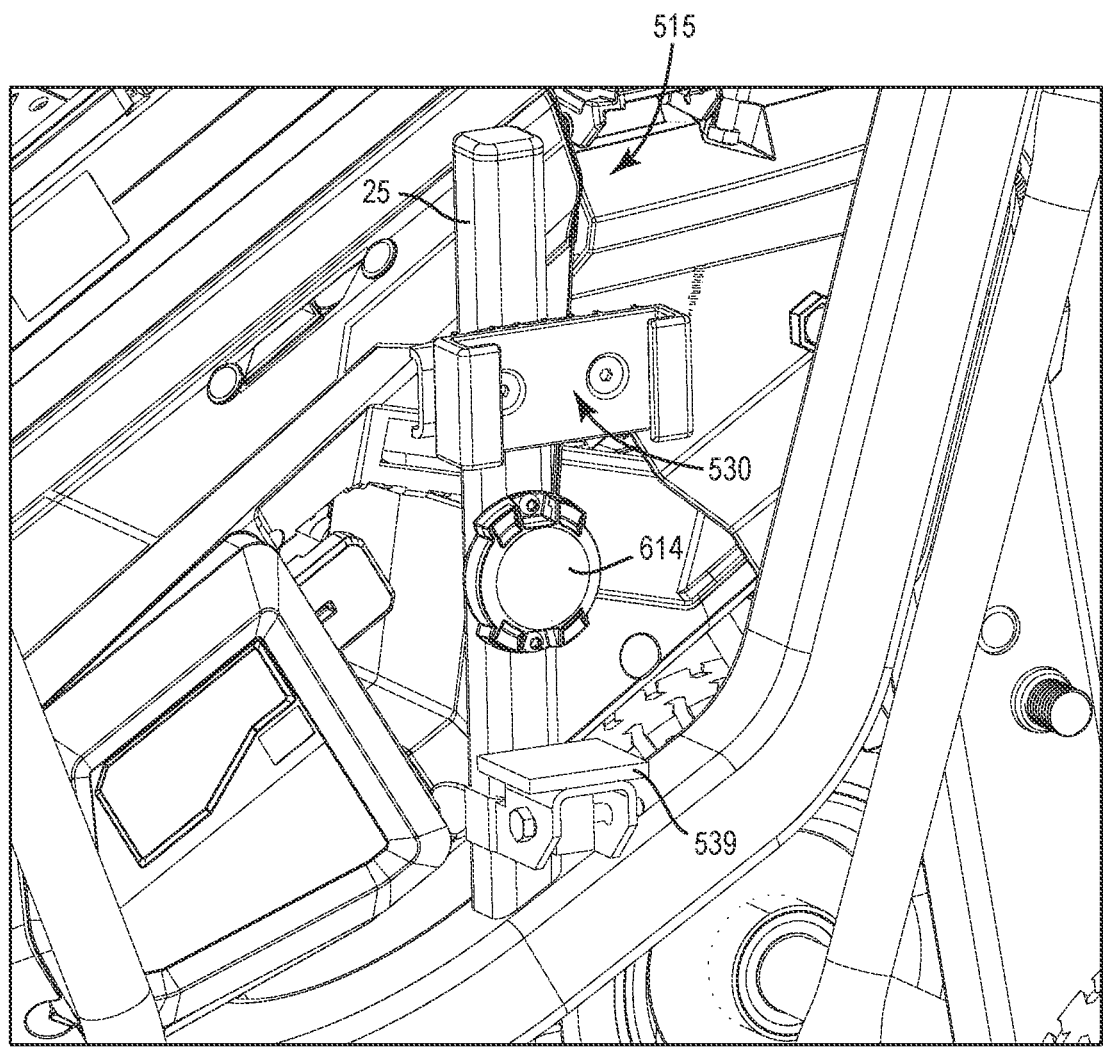
FIG. 10 is a perspective view of the battery mount of FIG. 9 without the battery pack.

With reference to FIG. 10, the cart 10 includes a tracking device 614. The tracking device 614 shares location information, last used date and time, and other metrics with a user. The tracking device 614 may communicate with a user via a Bluetooth enabled device such as a smart phone with an application for the tracking device 614. The tracking device 614 may be coupled to the frame 25 of the cart 10, the saw 15, or other components of the cart 10. The tracking device 614 may be coupled to the cart 10 using an adhesive, fasteners, tie wraps, or the like. In the illustrated embodiment, the tracking device 614 is mounted on the frame 25 of the cart 10 adjacent the battery pack mount 515. In some embodiments, the cart 10 includes other storage spaces to mount the tracking device to the cart 10 where the tracking device will not interfere with any moving components on the cart 10 or otherwise be subject to impacts or undesired contact during normal use of the cart 10.

Figure 14:
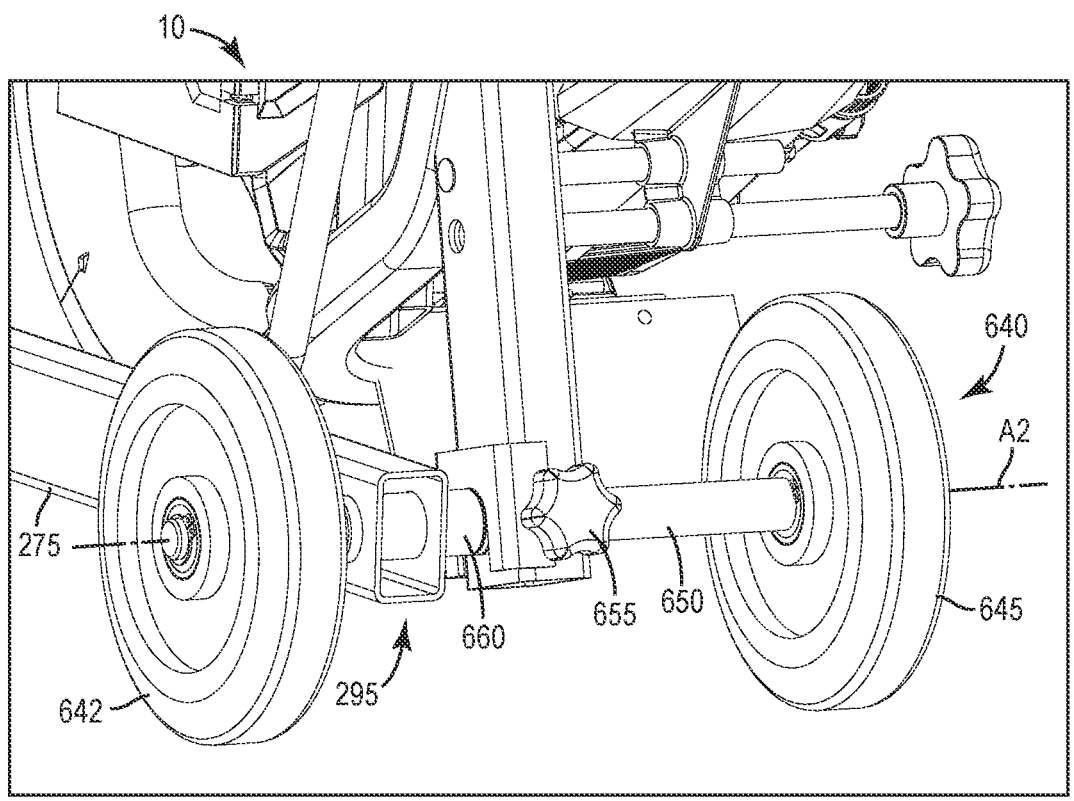
FIG. 14 is a rear perspective view of a rear wheel assembly according to another embodiment of the invention on the cart of FIG. 1A.

FIG. 14 illustrates a rear wheel assembly 640 for the cut off saw cart 10 according to another embodiment of the invention. The rear wheel assembly 640 includes a left wheel 642, a right wheel 645, a solid axle 650 connecting the left and right wheels 642, 645 and an adjustment knob 655. The axle 650 is supported by a tube 660 on the cart 10 that extends through the second end 295 of the wheel arm 275 and is coaxial with the axis A2. The axle 650 remains stationary within the tube 660 while the left and right wheels 640, 645 rotate around the axle 650. The adjustment knob 655 includes a threaded screw (not shown) that may be loosened in and out of contact with the axle 650. To adjust the lateral position of the axle 650 and wheels 640, 645, a user can rotate the adjustment knob 655 to loosen the threaded screw, allowing the axle 650 to slide linearly along the axis A2 within the tube 660. Once a desired position has been reached, a user can rotate the adjustment knob 655 to tighten the threaded screw and secure the axle 650 in place. This permits either of the wheels 640, 645 to be moved further inboard if it is desired to push the cart 10 with the attached saw 15 in close proximity to a wall.

Figure 16:
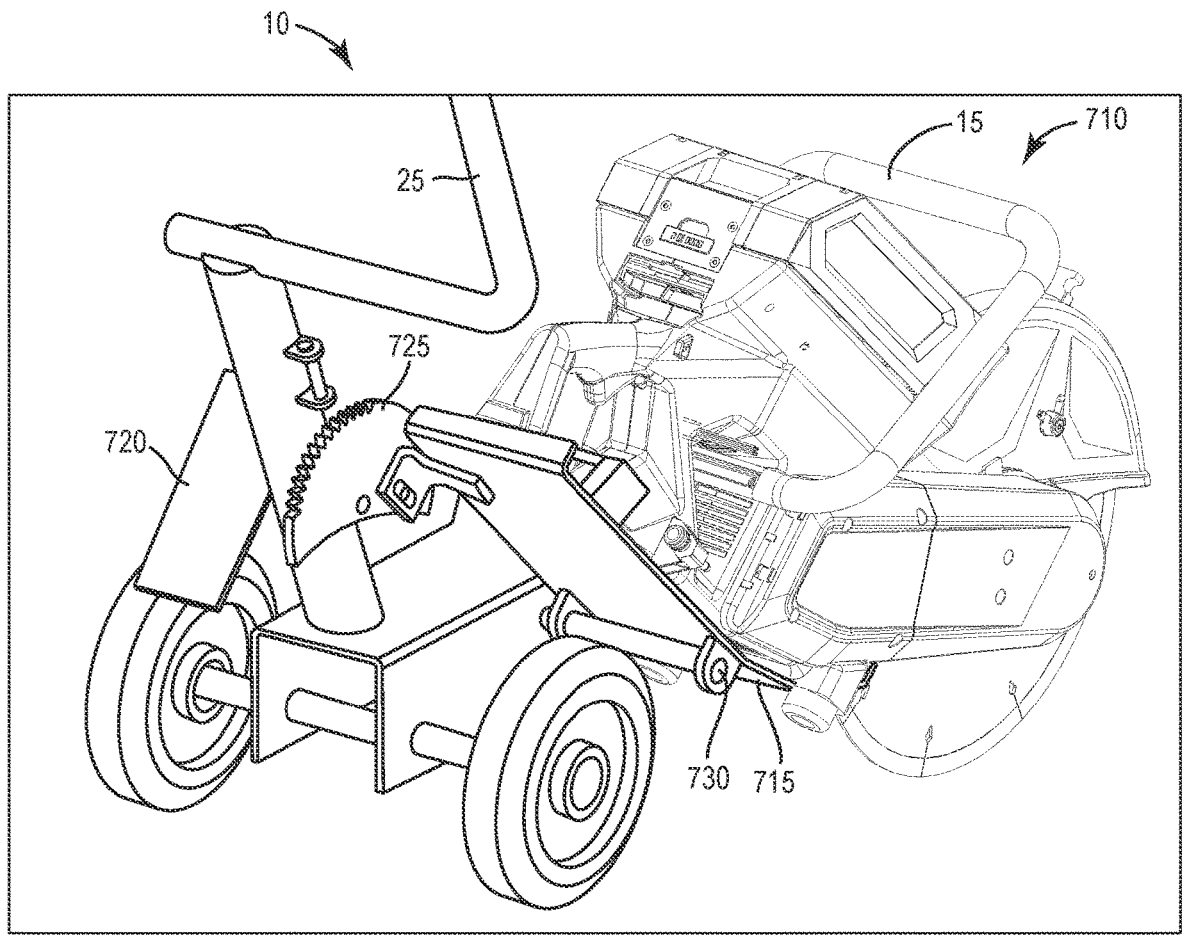
FIG. 16 is a perspective view of a depth adjustment assembly according to another embodiment of the invention on the cart of FIG. 1A.
Figure 17:
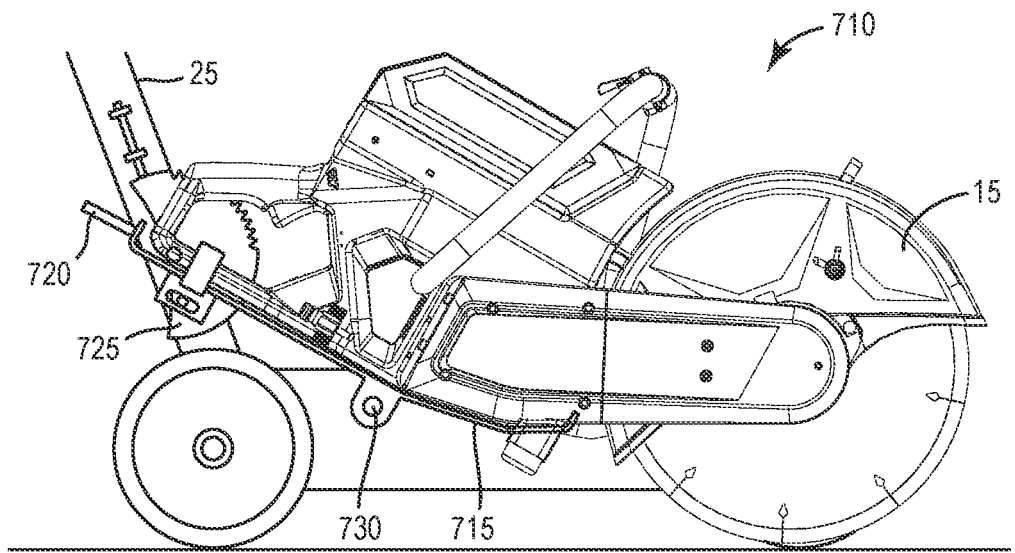
FIG. 17 is a side view of the depth adjustment assembly of FIG. 16 in a first position.
Figure 18:
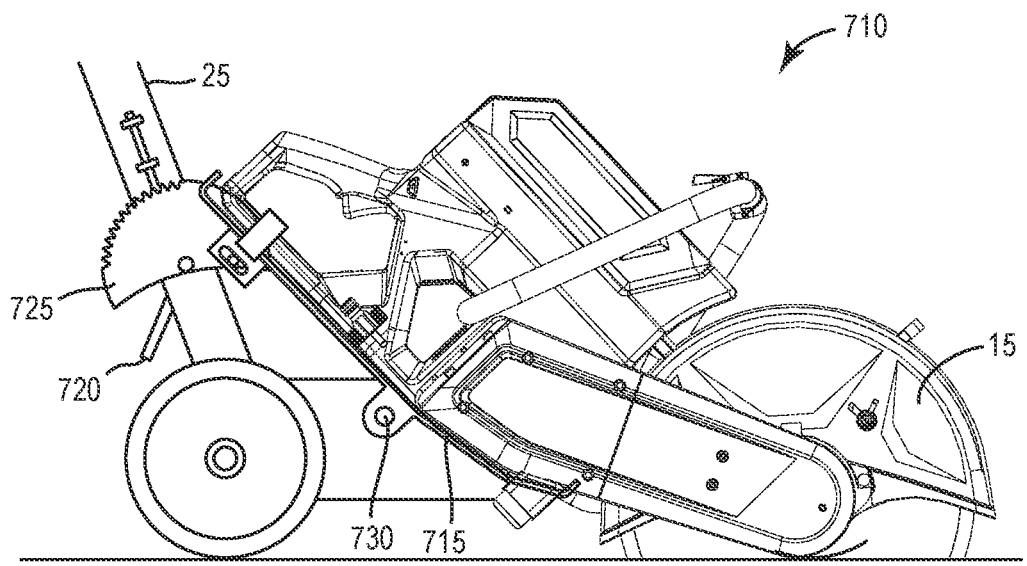
FIG. 18 is a side view of the depth adjustment assembly of FIG. 16 in a second position.

FIG. 16 illustrates a depth adjustment assembly 710 on the cart 10 according to another embodiment of the invention. The depth adjustment assembly 710 includes a mounting plate 715 that supports the saw 15, a foot treadle 720, and a ratchet gear 725. The mounting plate 715 is coupled to the frame 25 of the cart 10 about a pivot shaft 730. The mounting plate 715, and thus the saw 15, is pivotable relative to the frame 25 about the pivot shaft 730. The ratchet gear 725 is coupled to the mounting plate 715 on one side of the frame 25 and to the foot treadle 720 on the other side of the frame 25. As shown in FIGS. 23 and 24, a user may place their foot on the treadle 720 and rotate it backwards and forwards to rotate the mounting plate 715 to adjust the cutting depth of the saw 15 between a non-cutting position (FIG. 17) and a max cutting position (FIG. 18).

Figure 19:
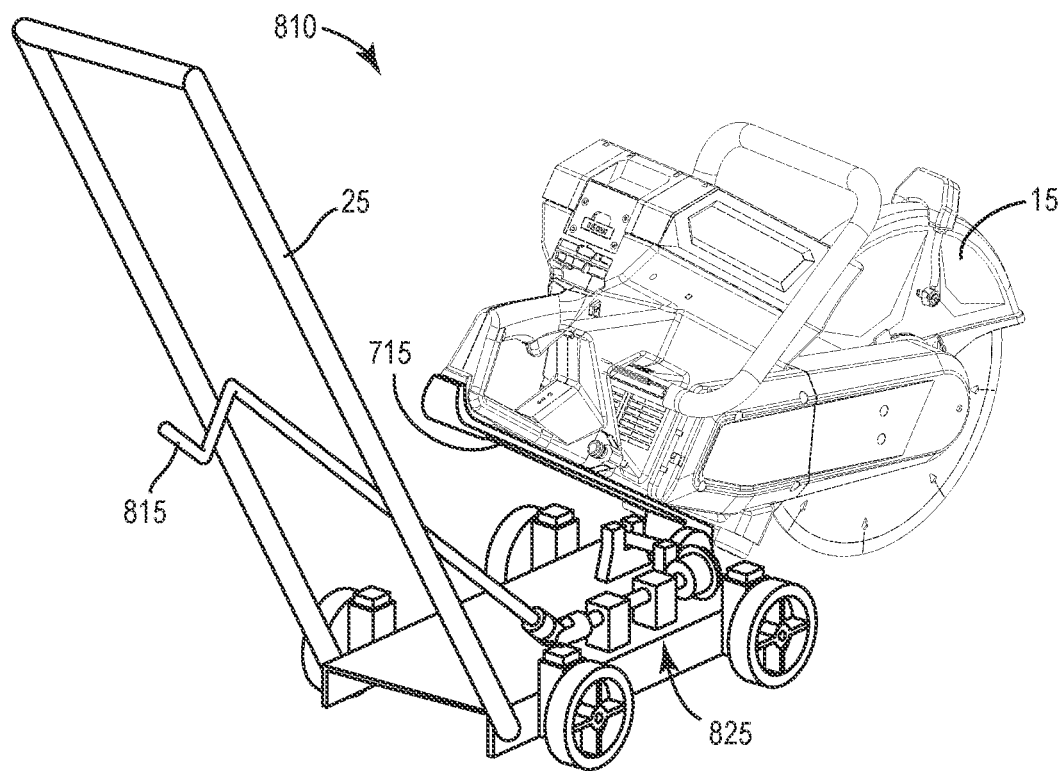
FIG. 19 is a perspective view of a depth adjustment assembly according to another embodiment of the invention on the cart of FIG. 1A.
Figure 20:
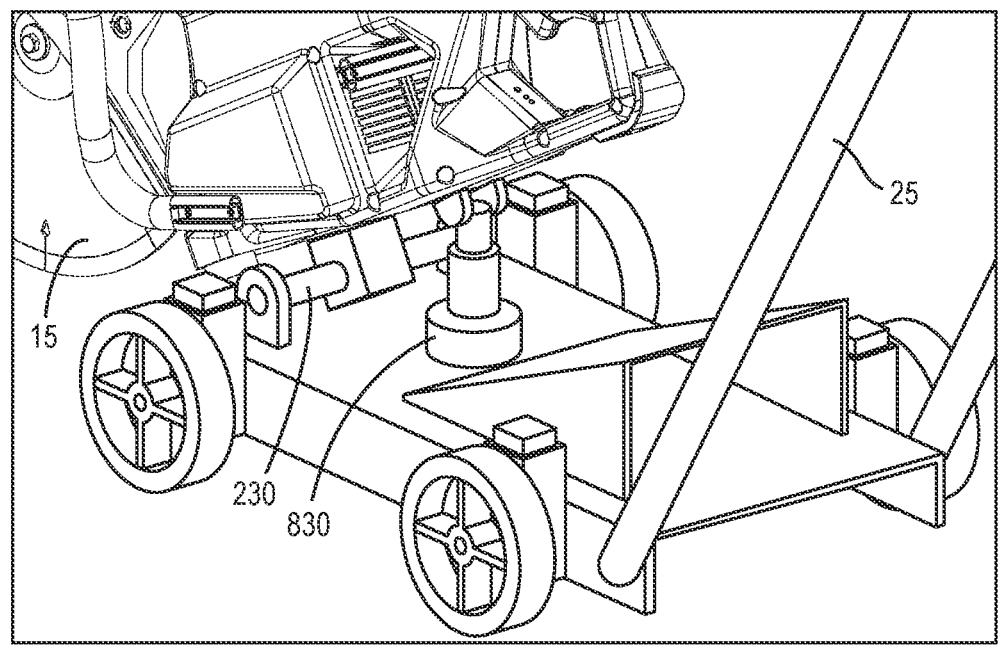
FIG. 20 is a perspective view of a depth adjustment assembly according to another embodiment of the invention on the cart of FIG. 1A.

FIG. 19 illustrates a depth adjustment assembly 810 according to another embodiment of the invention. The depth adjustment assembly 810 is similar to the depth adjustment assembly 710 but includes a hand crank 815 instead of a foot treadle 720. The hand crank 815 is coupled to the mounting plate 715 through a gear assembly 825. As a user rotates the hand crank 815, the gear assembly 825 is driven which pivots the mounting plate 715 about the pivot shaft 730 adjusting the cutting depth of the saw 15. In some embodiments, as shown in FIG. 20, an actuator 830 (e.g., a jack, pump, or the like) is coupled to the mounting plate 715. A user may then control the actuator 830 to pivot the mounting plate 715 about the pivot shaft 730.

Figure 21:
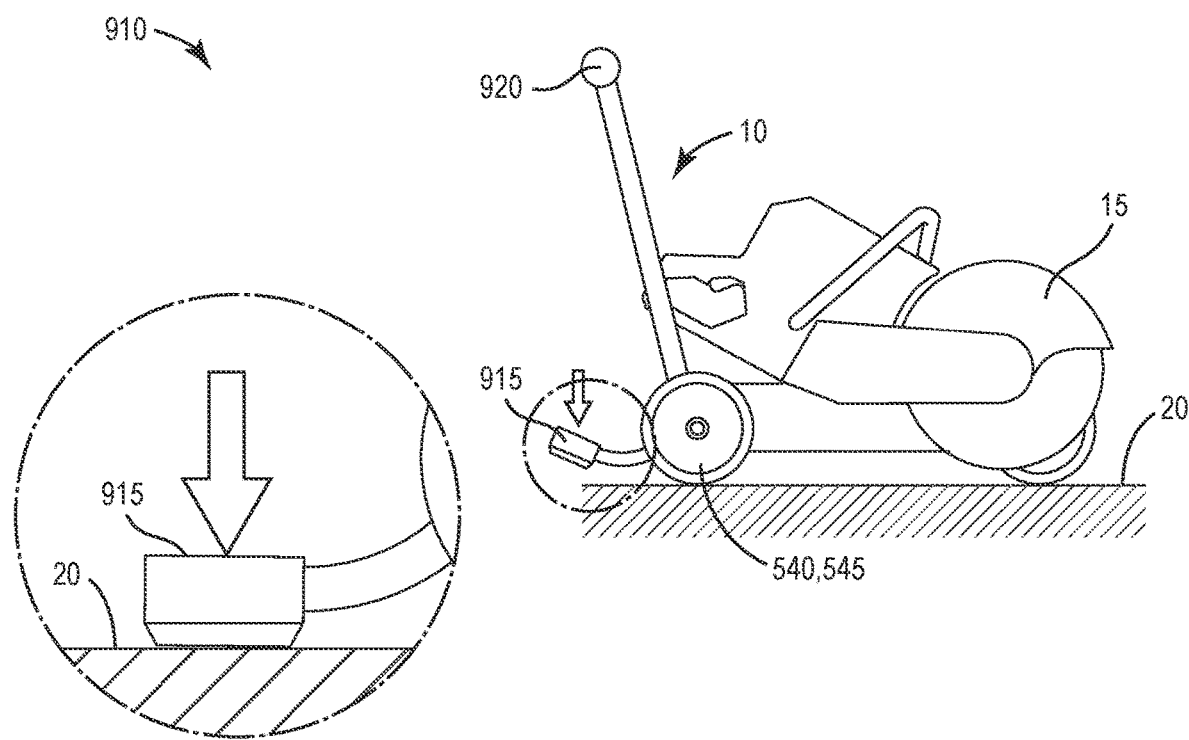
FIG. 21 is a perspective view of a depth adjustment assembly according to another embodiment of the invention on the cart of FIG. 1A.

FIG. 21 illustrates a depth adjustment assembly 910 on the cart 10 according to another embodiment of the invention. The depth adjustment assembly 910 includes a foot pedal 915 that when engaged releases a lock on the axle of the wheels 540, 545 allowing a push handle 920 to be pivoted forward to plunge the saw 15 into the support surface 20. When the foot pedal 915 is fully engaged, it rests on the support surface 20.

Figure 22:
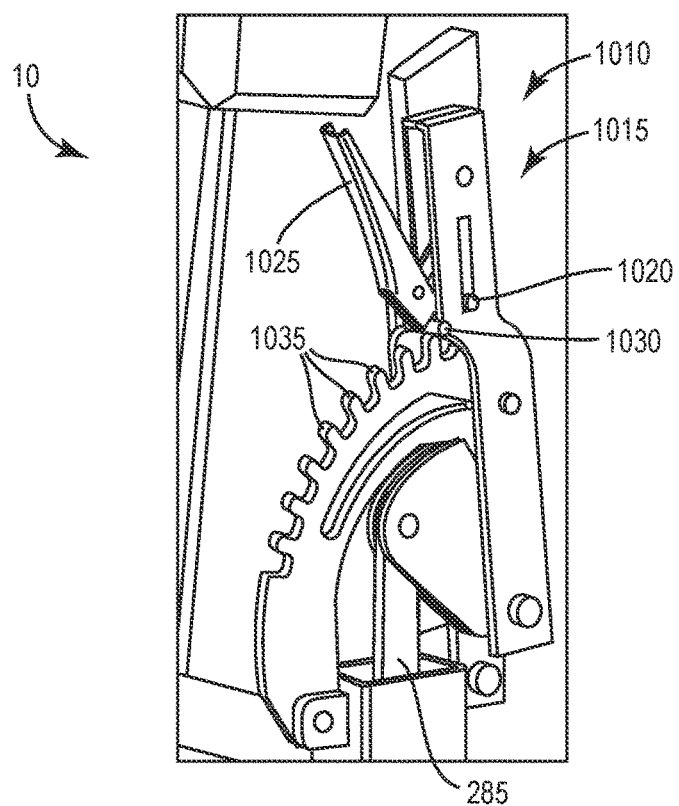
FIG. 22 is a perspective view of a depth adjustment assembly according to another embodiment of the invention on the cart of FIG. 1A.

FIG. 22 illustrates a depth adjustment assembly 1010 on the cart 10 according to another embodiment of the invention. The depth adjustment assembly 1010 is similar to the depth adjustment assembly 270 but includes a hand lever 1015 instead of a D-shaped handle 305. The hand lever 1015 includes a depth adjustment lock 1020, an actuator 1025, and a pin 1030 seated between depth adjustment teeth 1035 for locking the hand lever 1015. To adjust the cutting depth of the saw 15, a user grasps the depth hand lever 1015 and squeezes the actuator 1025 of the depth adjustment lock 1020. Squeezing the actuator 1025 lifts the pin 1030 out of engagement with the depth adjustment teeth 1035, allowing the hand lever 1015 to pivot toward a new position coinciding with a different cutting depth of the cutting wheel 85. Pivoting the hand lever 1015 translates the link 285, which then raises/lowers the wheel arm 275. Raising the wheel arm 275 lowers the cut off saw 15, thus increasing the cutting depth of the cutting wheel 85, whereas lowering the wheel arm 275 raises the cut off saw 15, thus reducing the cutting depth of the cutting wheel 85.

Although the invention has been described in detail with reference to certain preferred embodiments, variations and modifications exist within the scope and spirit of one or more independent aspects of the invention as described.

Various features of the invention are set forth in the following claims.

What is claimed is:

1. A cart for carrying a cut-off saw having a saw blade, the cart comprising:
   a frame including an upper portion and a lower portion;
   a wheel arm pivotably coupled to the lower portion of the frame about a first axis;
   a rear wheel assembly coaxial with the first axis and coupled to the frame and the wheel arm;
   a front wheel coupled to an end of the wheel arm opposite the rear wheel assembly;
   an adjustment lever pivotably coupled to the upper portion of the frame about a second axis; and
   a link having a first end pivotably coupled to the adjustment lever at a location spaced from the second axis, and a second end pivotably coupled to the wheel arm at a location between the first axis and the front wheel;
   wherein pivoting the adjustment lever about the second axis pivots the wheel arm about the first axis to adjust a vertical position of the front wheel relative to the upper portion of the frame, and therefore a vertical position of the saw blade relative to a support surface of the cart.

2. The cart of claim 1, wherein the front wheel moves relative to the upper portion of the frame along an arc having an origin intersected by the first axis.

3. The cart of claim 1, wherein the first axis is parallel with the second axis.

4. The cart of claim 1, wherein the adjustment lever includes a bracket, wherein the first end of the link is pivotably coupled to a lower end of the bracket.

5. The cart of claim 4, wherein the adjustment lever includes a handle in which the bracket is at least partially received, and wherein the second axis is located between the handle and the lower end of the bracket.

6. The cart of claim 5, further comprising a gear coupled to the upper portion of the frame adjacent the bracket, the gear including a plurality of gear teeth, wherein the adjustment lever further comprises an actuator having an upper end that protrudes from an internal opening in the handle and an opposite, lower end that is engageable with the gear teeth to maintain the adjustment lever in one of a plurality of orientations relative to the gear that coincide with different positions of the wheel arm relative to the frame.

7. The cart of claim 5, further comprising:
   a handle configured to be grasped by a user pushing the cart; and
   a joint for securing the handle in a desired rotational position relative to the frame,
   wherein the joint is coaxial with the second axis.

8. The cart of claim 1, wherein pivoting the adjustment lever toward the front wheel pivots the wheel arm towards the upper portion of the frame, thereby lowering the position of the saw blade relative to the support surface, and wherein pivoting the adjustment lever away from the wheel arm pivots the front wheel away from the upper portion of the frame, thereby raising the position of the saw blade relative to the support surface.

9. The cart of claim 1, wherein the wheel arm is pivotable between a first extreme position in which the saw blade is at a maximum vertical position relative to the support surface and a second extreme position in which the saw blade is at a minimum vertical position relative to the support surface.

10. The cart of claim 9, wherein a vertical distance between the front wheel at the first extreme position of the wheel arm and the front wheel at the second extreme position of the wheel arm is greater than a maximum plunge depth of the saw blade.

11. A cart for carrying a cut-off saw having a saw blade, a motor drivably coupled to the saw blade, and a trigger for varying the rotational speed of the motor and saw blade, the cart comprising:
- a frame;
- a handle coupled to the frame;
- a throttle lever pivotably coupled to the handle;
- a throttle cable having a first end and a second end opposite the first end, the first end proximate the trigger to selectively pull the trigger, thereby varying the rotational speed of the motor and saw blade; and
- an actuator supported by the handle and movable between a first position, in which pivoting movement of the throttle lever is incapable of tensioning the throttle cable for pulling the trigger, and a second position, in which pivoting movement of the throttle lever tensions the throttle cable for pulling the trigger.

12. The cart of claim 11, wherein the throttle cable extends through a portion of the handle and/or the frame.

13. The cart of claim 11, wherein the actuator is a push button.

14. The cart of claim 11, further comprising a resilient member biasing the actuator toward the first position.

15. The cart of claim 11, further comprising an interlock system including the actuator, a first bracket coupled to the throttle lever for co-rotation therewith, and a second bracket that is coupled to the second end of the throttle cable.

16. The cart of claim 15, wherein moving the actuator from the first position to the second position rotationally unitizes the first and second brackets such that pivoting movement of the throttle lever tensions the throttle cable for pulling the trigger.

17. The cart of claim 11, further comprising an actuator arm coupled to the first end of the throttle cable, wherein the actuator arm is configured to depresses the trigger in response to the throttle lever tensioning the throttle cable.

18. The cart of claim 17, further comprising a mount, coupled to the frame, within which a rear handle of the cut-off saw is receivable, wherein the actuator arm is pivotably coupled to the mount.

19. The cart of claim 18, wherein the mount includes
- a housing coupled to the frame,
- a cover removably coupled to the housing and defining a cavity with the housing within which the rear handle of the cut-off saw is receivable, and
- a latch for securing the cover in a closed position.

* * * * *